United States Patent
Möller

(10) Patent No.: US 11,898,056 B2
(45) Date of Patent: Feb. 13, 2024

(54) POLYMER-BASED SUBSTRATE AND METHOD FOR PRODUCING THE SAME

(71) Applicant: Ensinger GmbH, Nufringen (DE)

(72) Inventor: Michael Möller, Cham (DE)

(73) Assignee: ENSINGER GMBH, Nufringen (DE)

( * ) Notice: Subject to any disclaimer, the term of this patent is extended or adjusted under 35 U.S.C. 154(b) by 782 days.

(21) Appl. No.: 16/892,531

(22) Filed: Jun. 4, 2020

(65) Prior Publication Data

US 2020/0290084 A1    Sep. 17, 2020

Related U.S. Application Data

(63) Continuation of application No. PCT/EP2018/078369, filed on Oct. 17, 2018.

(30) Foreign Application Priority Data

Dec. 8, 2017    (DE) .......................... 102017129353.1

(51) Int. Cl.
    *C09D 177/06*      (2006.01)
    *C08J 7/04*      (2020.01)
    (Continued)

(52) U.S. Cl.
    CPC ............. *C09D 177/06* (2013.01); *B05D 1/06* (2013.01); *B05D 3/005* (2013.01); *B05D 7/02* (2013.01);
    (Continued)

(58) Field of Classification Search
None
See application file for complete search history.

(56) References Cited

U.S. PATENT DOCUMENTS

| | | |
|---|---|---|
| 5,741,846 A | 4/1998 | Lohmeijer et al. |
| 6,035,596 A | 3/2000 | Brunnhofer |
| | (Continued) | |

FOREIGN PATENT DOCUMENTS

| | | |
|---|---|---|
| CA | 1082997 A | 8/1980 |
| CA | 1324339 C | 11/1993 |
| | (Continued) | |

OTHER PUBLICATIONS

Arash et al., "Mechanical properties of carbon nanotube/polymer composites", *Scientific Reports*, 4(6479): 1-8 (2014).
(Continued)

*Primary Examiner* — Laura C Powers
(74) *Attorney, Agent, or Firm* — Leydig, Voit & Mayer, Ltd.

(57) ABSTRACT

A polymer-based substrate is proposed, which in particular is electrostatically coatable, wherein the substrate comprises a substrate base body made using a polymeric material and a coating applied to a surface region of the substrate base body, wherein the polymeric material comprises a first polymer, wherein the coating comprises a matrix polymer and an additive which is dispersed in the matrix polymer and reduces the surface resistance of the coating, said additive having a proportion that is selected such that the specific surface resistance of the coating is about $10^{10}$ Ohm or less, and wherein the matrix polymer is selected such that it is compatible with the first polymer.

12 Claims, 8 Drawing Sheets

(51) Int. Cl.

| | | |
|---|---|---|
| *C08J 7/044* | (2020.01) | |
| *C09D 5/24* | (2006.01) | |
| *C09D 177/02* | (2006.01) | |
| *C09D 177/10* | (2006.01) | |
| *B05D 1/06* | (2006.01) | |
| *B05D 3/00* | (2006.01) | |
| *B05D 7/02* | (2006.01) | |
| *C08J 7/043* | (2020.01) | |
| *C08J 7/048* | (2020.01) | |

(52) U.S. Cl.
CPC ............... *C08J 7/043* (2020.01); *C08J 7/044* (2020.01); *C08J 7/048* (2020.01); *C08J 7/0427* (2020.01); *C09D 5/24* (2013.01); *C09D 177/02* (2013.01); *C09D 177/10* (2013.01); *C08J 2379/08* (2013.01); *C08J 2479/08* (2013.01)

(56) References Cited

U.S. PATENT DOCUMENTS

| | | |
|---|---|---|
| 6,221,283 B1 | 4/2001 | Dharmarajan et al. |
| 2002/0142101 A1 | 10/2002 | Holzapfel et al. |
| 2003/0035910 A1 | 2/2003 | Ensinger |
| 2007/0298267 A1 | 12/2007 | Zhong et al. |
| 2008/0138610 A1 | 6/2008 | Neuhauser et al. |
| 2011/0097544 A1 | 4/2011 | Grün et al. |
| 2011/0098089 A1 | 4/2011 | Irie et al. |
| 2011/0306255 A1 | 12/2011 | Rathenow |
| 2013/0344314 A1 | 12/2013 | Shokri et al. |
| 2015/0064428 A1 | 3/2015 | Matsuo et al. |
| 2015/0348671 A1 | 12/2015 | Fujiki et al. |
| 2016/0121361 A1 | 5/2016 | Lendl et al. |
| 2016/0255184 A1 | 9/2016 | Hwang |

FOREIGN PATENT DOCUMENTS

| | | |
|---|---|---|
| CN | 101123314 A | 2/2008 |
| CN | 104185547 A | 12/2014 |
| CN | 105517791 A | 4/2016 |
| DE | 32 36 357 A1 | 4/1984 |
| DE | 10 2005 013 082 A1 | 8/2006 |
| DE | 10 2011 110 899 A1 | 2/2013 |
| EP | 0 667 625 A1 | 8/1995 |
| EP | 0 685 527 B1 | 3/1997 |
| EP | 0 667 625 B1 | 7/1997 |
| EP | 0 638 368 B1 | 8/1997 |
| EP | 0 957 226 A1 | 11/1999 |
| EP | 1 223 188 B1 | 2/2005 |
| EP | 2 071 585 A1 | 6/2009 |
| EP | 2 071 858 A1 | 6/2009 |
| EP | 2 360 341 B1 | 6/2012 |
| EP | 2 559 838 A2 | 2/2013 |
| EP | 2 957 597 A1 | 12/2015 |
| EP | 2 427 518 B1 | 4/2017 |
| JP | 2002003789 A * | 1/2002 |
| WO | WO 1995/022152 A1 | 8/1995 |
| WO | WO 1997/34709 A1 | 9/1997 |
| WO | WO 99/08808 A1 | 2/1999 |
| WO | WO 2001/048346 A1 | 7/2001 |
| WO | WO 2005/097902 A1 | 10/2005 |
| WO | WO 2010/128013 A1 | 11/2010 |
| WO | WO 2014/187982 A1 | 11/2014 |
| WO | WO 2014/202724 A1 | 12/2014 |
| WO | WO 2015/159261 A1 | 10/2015 |

OTHER PUBLICATIONS

Chen et al., "Fabrication of Highly Transparent and Conductive Indium-Tin Oxide Thin Films with a High Figure of Merit via Solution Processing", *Langmuir*, 29: 13836-13842 (2013).

Zhou Nanxing, "Questions and Answers of Practical Electrical Technology", *China Water & Power Press*.

International Search Authority, Translation of the International Preliminary Report on Patentability in counterpart International Patent Application No. PCT/EP2018/078369, dated Jun. 18, 2020.

German Patent & Trademark Office, Search Report in counterpart German Priority Application No. 10 2017 129 353.1, dated Jul. 26, 2018.

International Search Authority, International Search Report in counterpart International Patent Application No. PCT/EP2018/078369, dated Apr. 12, 2019.

International Search Authority, International Written Opinion in counterpart International Patent Application No. PCT/EP2018/078369, dated Apr. 12, 2019.

Bauer et al., Saechtling Kunststoff Taschenbuch, 30th Edition 2007; Hanser, Table 8.5.; p. 739.

Landreth et al., Municipal Solid Wastes: Problems and Solutions, *CRC Press LLV*, Edition 1997.

Xanthos, M., Functional Fillers for Plastics, *Wiley VCH*, 2nd edition published in 2010, Chapter 18 (pp. 351-372).

* cited by examiner

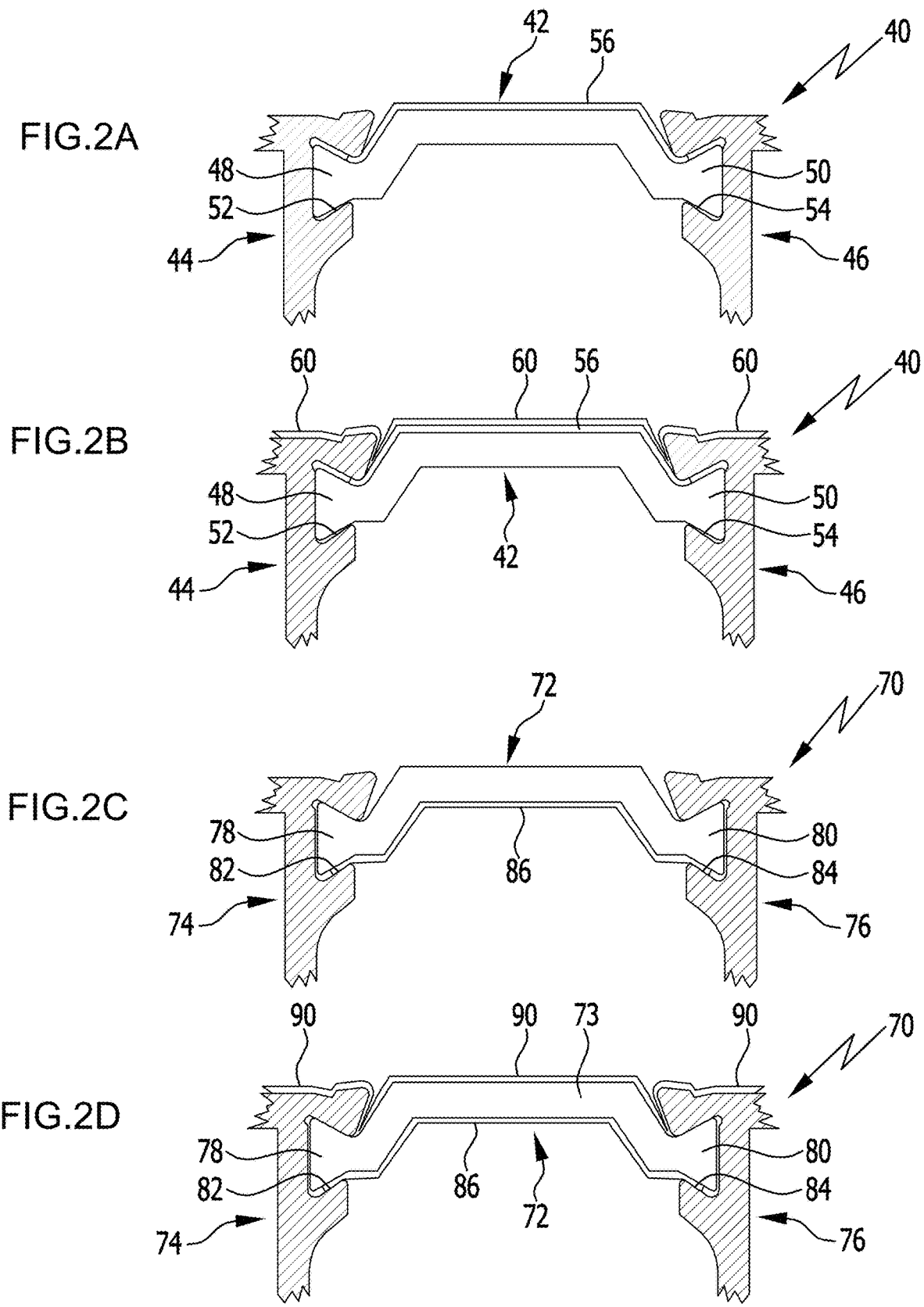

POLYMER-BASED SUBSTRATE AND METHOD FOR PRODUCING THE SAME

CROSS-REFERENCE TO RELATED APPLICATIONS

This patent application is a Continuation of International Patent Application No. PCT/EP2018/078369, filed on Oct. 17, 2018, which claims the benefit of German Patent Application No. 10 2017 129 353.1, filed on Dec. 8, 2017, which each are incorporated by reference.

BACKGROUND OF THE INVENTION

The invention relates to a polymer-based substrate, which in particular is electrostatically coatable, and a method for producing the same.

Electrostatic coating, in particular powder lacquering of substrates, is of great importance in many application areas, not only for decorative purposes but in particular also as protection against corrosion.

Substrates are considered to take well to being powder lacquered if, e.g., the following points apply:
a) a good powder attraction and a homogeneous powder coverage when spraying the electrostatically charged lacquer powder onto the grounded or electrically charged substrate;
b) an error-free setting, e.g., by baking, melting, sintering, thermally hardening the lacquer—especially without bubble formation or hole formation within the lacquer layer or between the substrate and the lacquer layer;
c) a firm adhesion of the lacquer layer to the substrate in order to prevent a delamination, flaking, or crumbling of the lacquer layer.

In WO 97/34709 A1, a method for electrostatically coating substrates, in particular in the automotive sector, is proposed, in which the substrate is produced from a composition which has a mixture of a thermoset, a filler, and/or a reinforcing substance with a proportion of at least 30% by weight and less than 3% by weight of soot with a primary particle size of less than 125 nm, wherein the substrate has a conductivity of at least $10^{-14}$ S/cm.

Powder lacquerable substrates in the form of heat-insulating profiles or insulating webs for metal-plastic composite profiles are known from EP 0 638 368 A1. Here the surface located on the outside in the installed state of the insulating profiles is provided with an electrically conductive coating, which, however, maintains a respective distance from the metal profiles in the composite so as to not impair the thermal insulation of the metal profiles as far as possible.

For the purposes of applying the electrically conductive coating, EP 0 638 368 A1 suggests, in addition to flame spraying, electrodeless plasma spraying, electric arc spraying, low pressure spraying, also the application by means of ion beam, a galvanic application and finally also the coextrusion of the electrically conductive coating on the heat-insulating web. It also described that the material of the insulating web can also be made electrically conductive by embedding conductive soot, metal powders or metal fibers, and thus an improved adhesion of the powder lacquering is achieved.

In accordance with EP 0 638 368 A1, the electrically conductive coating may be applied to the surface of the insulating web that is to be covered with the powder lacquer layer as a closed coating or in a punctiform application.

Polyamide materials electrostatically coated with a powder lacquer are described in EP 0 667 625 B1. The polyamide material hereby contains, in addition to the polyamide, up to 10% by weight of carbon fibers and 30 to 60% by weight of a metallic powder, wherein the weight ratio of the metallic powder to the carbon fibers should be 150:1 to 6:1. This results in plastic components that can be powder lacquered together with metal parts.

In EP 0 685 527 B1, a specific polyphenylene ether polyamide-based polymeric material with 1 to 7 parts by weight conductive soot per 100 parts by weight polymer is suggested, such that, for one, an Izod impact strength of more than 15 kJ/m² and a volumetric resistance value of less than $10^6$ Ohm·cm becomes achievable. The polymeric material is designed for applications in which an electrostatic coating process is used.

EP 1 223 188 B1 suggests applying an electrically conductive primer layer to the surface to be provided with a powder lacquer layer, which primer layer contains at least a proportion of 45% by weight of an acrylic resin and optionally a proportion of a phosphoric acid-modified polymer.

EP 2 071 585 A1 proposes a thermoplastic composition with a continuous phase based on polyamide, in which a polyphenylene ether is dispersed. The composition further contains a conductivity additive, which is contained in the continuous phase at a proportion of at least 50%. The volumetric resistance is less than $10^5$ Ohm·cm. A field of application for the material is the automotive industry in which metallic and plastics-based components are often subjected to a powder lacquering together.

A further method for coating substrates, which is tailored to the automotive industry, is known from WO 2005/097902 A1. An electrically conductive polyamide composition is proposed for the production of the substrates, which composition contains, in addition to the polyamide as the main component, a proportion of a novolac resin, a proportion of a reinforcing substance, and at least 0.1% by weight of an electrically conductive particulate filler.

Electrically conductive polyamide moulding masses with a reduced water absorption capacity are described in EP 2 427 518 B1. The moulding masses contain, in addition to the polyamide, a polymerizate of the propylene, a compatibilizer in the form of graft copolymers of the polypropylene as well as a proportion of carbon nanotubes (CNT).

The problems in the methods in the prior art are insufficient powder lacquer coverage, which is observed again and again, insufficient lacquer adhesion, and/or bubble formation in the lacquer layer after the powder coating in the field of plastic components, for example insulating webs of composite profiles.

In particular in the case of substrates to be lacquered that are produced on the basis of polyamide materials, there are often very narrow, difficult, or not controllable ranges for process parameters, which are to be met so as to avoid, e.g., bubble formation (too high residual moisture content in the substrate) and insufficient powder lacquer coverage or other lacquer errors like, for example, deviations in lacquer thickness (generally insufficient electrostatic properties of the substrate and/or too low residual moisture content of the substrate).

In many known methods in the prior part, the polymeric material in the volume is modified, e.g., through the addition of electrically conductive fillers, so as to achieve an improved conductivity/dissipative capacity in the volume. Said fillers may thereby negatively affect certain physical properties like, for example, the mechanical strength or thermal conductivity, but also, e.g., the material costs.

BRIEF SUMMARY OF THE INVENTION

The object underlying the present invention is therefore to provide substrates in which the electrostatic powder lacquerability is improved in a reproducible and process-stable manner, without the basic material or product properties thereof, like, e.g., the heat insulation properties being significantly (negatively) diminished.

This object is achieved in a polymer-based substrate with the features of Claim 1.

In accordance with the invention, a coating is applied to a surface region of a substrate base body made using a polymeric material, which substrate base body is substantially electrically non-conductive, wherein the coating comprises a matrix polymer and an additive which is dispersed in the matrix polymer and reduces the surface resistance of the coating, said additive having a proportion that is selected such that the specific surface resistance of the coating is about $10^{10}$ Ohm or less. The polymeric material of the substrate base body hereby comprises a first polymer, which is compatible with the matrix polymer of the coating.

The substrates in accordance with the invention deliver results that are reproducible in particular in electrostatic powder lacquering and prove to be process-stable, even in the case of substrates with low moisture contents.

Surprisingly, it was also found that the mechanical properties of the substrates are hardly changed by the method in accordance with the invention for coating substrates, which constitutes a significant advantage for products like insulating webs or attachment parts in the automotive sector. This is surprising in particular because the method in accordance with the invention includes the use of solvents which, under certain circumstances, are able to partially dissolve the substrate.

In many applications—specifically in the use case of heat-insulating profiles—the substrates in accordance with the invention are used in connection with at least one metal profile, and then are typically electrostatically powdered or subjected to a powder lacquering.

In this case, it is advantageous if the coating is applied to the substrate that is connected to at least one metal profile, for example an aluminum profile, in such a way that, after connecting the substrate to the metal profile, the coating with a reduced surface resistance has an electrically conductive contact to the metal profile. A good powder attraction and thus a good lacquer coverage rate upon powder coating can then be achieved here, primarily by way of a so-called grounded mechanism.

According to another variant, a good powder attraction can be achieved by way of a so-called capacitive mechanism without the coating with reduced surface resistance being in direct electrically conductive contact with the metal profile. Here it is possible for the coating to be applied to the substrate base body in such a way that the coating then remains without any contact with the metal profile.

In the grounded mechanism within the meaning of the present invention, a charge applied by way of electrostatically charged powder particles is dissipated from the substrate by means of a grounded electrical line. Repulsive electrostatic forces are thus prevented from forming or building up during the powder application, which prevent a full-area, homogeneous powder application.

In the capacitive mechanism within the meaning of the present invention, among other things a local capacity is provided on the substrate for receiving electrical charge; said electrical charge is at first not dissipated, but rather only distributed over larger areas, thereby reducing the acting electrical field forces (in particular repulsive forces between powder particles charged with the same sign, i.e., a charge of the same type).

DETAILED DESCRIPTION OF THE INVENTION

The specific surface resistance of a coating in accordance with the invention is preferably about $10^9$ Ohm or less, in particular $10^8$ Ohm or less.

For comparison: the specific surface resistance of dry polyamide 66 (PA66) without the addition of conductive additives is about $10^{12}$ Ohm to about $10^{13}$ Ohm.

The specific surface resistance of the coating is measured in a dry state ("worst state" with PA 66≤0.3% moisture content) or after storage at 23° C.+/−2° C. and at 50%+/−10% relative humidity and according to the specifications of DIN EN 61340-2-3.

Alternatively, a measurement can be carried out according to an accelerated method in which a surface resistance is determined by means of electrodes with point-shaped measuring tips, which method however is limited to a measuring range of up to about $10^8$ Ohm. Commercially available digital multimeters, which may be used with the accelerated method, typically have, depending on the model, a measuring range of electrical resistance in the order of magnitude of up to about 10' Ohm, possibly up to about $10^8$ Ohm. The electrodes are hereby positioned, e.g., at intervals of 1 cm on the surface to be measured.

Because the measurement of the surface resistance according to the accelerated method above typically results in a higher value than the measurement of the specific surface resistance according to the standard test method described above, in which the measurement is performed on a square area, wherein the electrodes are arranged on two opposing sides of the square, the accelerated method allows for a determination in each case as to whether in a sample the specific surface resistance is below an upper limit of, e.g., $10^{10}$ Ohm, in particular below $10^9$ Ohm or below $10^8$ Ohm, or not.

If a measured value for the surface resistance of, e.g., $10^8$ Ohm or less, is obtained according to this accelerated method, a conclusion can be made regarding the specific surface resistance, which in such a case is significantly less than $10^9$ Ohm. If no value is displayed due to exceeding the measuring range of the multimeter, this on the other hand does not allow the conclusion that the specific surface resistance is above $10^9$ Ohm; this must be tested again in such a case using a device with a greater measuring range.

The measurement of the specific surface resistance can be carried out precisely according to the standard testing method described above, though problems may arise in the implementation of the standard testing method in some cases where the sample to be tested has a complex, small-scale surface geometry. Here, the measurement of the surface resistance may then alternatively take place using the accelerated method, as described above. In the case of already (powder) lacquered patterns, a preparative exposure of the coating with a reduced surface resistance may be carried out in order to then carry out a measurement of the surface resistance.

Of course, the coating to be used in accordance with the invention may be applied to a sufficiently dimensioned planar test piece, which is made of the polymeric material of the substrate base body, and then the specific surface resistance can be determined according to the standard method.

In accordance with the invention, the polymeric material of the substrate base body comprises a first polymer and the coating comprises a matrix polymer, the latter being selected such that it is compatible with the first polymer.

Two polymers are compatible within the meaning of the present invention if the polymers can molecularly or microscopically mix. On a molecular level, this means that the polymer chains of the polymers can be mixed, entangled, and/or penetrated, thereby preferably resulting in a single-phase polymer mixture in a region (e.g., in a volume region of an interface or in a diffusion zone). Such a polymer mixture may then have, e.g., homogeneous properties that are between the properties of the individual polymeric constituent parts. This may be, for example, a homogeneous new melting point with partially crystalline polymers or a homogeneous glass transition point, e.g., with compatible mixtures of PA6 and PA66. The determination of the characteristic variables is described, for example, in *Ehrenstein, Trawiel, Riedel: Praxis der Thermischen Analyse von Kunststoffen,* 1998, Carl Hanser Verlag München, ISBN 3-446-21001-6, Chapter 1.2.3.7.

There is a microscopic mixture if the two polymers have a tendency to segregate due to incompatibilities (phase-segregated polymers), though such a two-phase system has a large interface and forms, e.g., co-continuous structures or gyroidal structures or other polymeric mixed-phases as structures in an intermediate region. These structures are perceived macroscopically as a mixture, while microscopic segregation can be detected, for example using electron microscopic imaging methods or, for example, by means of x-ray diffraction experiments. Microscopically mixable within the meaning of the present invention are polymers in which, in a mixture with each other, in the best-case scenario, island structures or domains with an average diameter or a domain size of about 5 µm or less remain. The average diameter or the average domain size can be determined by means of simple manual measurement using the electron microscopic images.

With co-continuous phases, microscopic undercuts provide for, e.g., a positive-locking connection of the two phases. Macroscopically, however, no common properties like a common melting point or a common glass transition temperature can be determined here.

By forming a mixture, i.e., a homogeneous molecular or a microscopic mixture of the first polymer and the matrix polymer of substrates in accordance with the invention, a gradual transition of the material (first polymer) of the substrate base body to the material (matrix polymer) of the coating is created in a defined transition phase. Forces are thereby transmitted physically, but also through chemical interactions and bondings. The adhesion of the coating to the substrate base body is therefore excellent and an undesired stripping of the coating is avoided. The aforementioned configuration of the mixture of the first polymer and the matrix polymer is influenced substantially by the selection of a suitable solvent in the coating composition.

In a typical application of non-mixable coating materials to a substrate, there is a single-stage transition of the materials; the adhesion in the interface is then ensured primarily by the chemical bonds and interactions.

The substrates in accordance with the invention take well to being electrostatically powder lacquered. In particular, the powder lacquering may be performed without the surface regions of the substrates in accordance with the invention that are to be lacquered having to be pretreated, for example by means of plasma or corona treatment or roughening. A particularly economical processing of the substrates in accordance with the invention is thereby possible. Moreover, the substrates in accordance with the invention are also suitable for use as thermal insulating profiles.

Of course, the substrates in accordance with the invention may nonetheless be processed further using methods of surface treatment stated above in order to modify, improve, or adapt surface properties to a certain application purpose.

Furthermore, the substrates in accordance with the invention can be satisfactorily powder lacquered, even when the surface regions to be lacquered have a complex geometric structure, in particular even with undercut shaping, three-dimensional molded bodies (e.g., attachment parts for vehicles or machines), but also complicated profile geometries like, e.g., hollow profiles. In particular insulating webs and heat-insulating profiles, as they are known, for example, from the product range of the trademark Insulbar® of the company Ensinger GmbH or from WO 01/48346 A1, are suitable as substrate base bodies. Heat-insulating profiles may even serve as supporting frame profiles or frame shells in window, door, roof, and facade applications.

Substrates in accordance with the invention may be electrostatically lacquered, in particular powder lacquered, with a high lacquer coverage. The rate of lacquer coverage is about 90% or more, preferably about 95% or more, particularly preferably about 98% or more. In the ideal case, a rate of 100% lacquer coverage is achieved in the region prepared for lacquering.

The lacquer coverage can be quantified by determining the surface portions without lacquer application—if present—within a representative reference area of a lacquered surface. In particular true-to-scale, undistorted photographs or light-microscopic images at 50-times magnification are suitable for evaluation. A representative reference area in the form of a rectangular section of the surface has, e.g., a length of 25 mm in the longitudinal and transverse direction and is preferably located in the directly visible area. Then the surface portions which are not covered by lacquer (=lacquer-free area) are determined within this reference area. This may be performed by measuring the surface integral manually or determining it with the support of software. This analysis may optionally be repeated at different locations. The rate of lacquer coverage is then calculated as follows:

$$\text{lacquer coverage in \%} = 100\% \times \left(1 - \frac{\text{lacquer} - \text{free area}}{\text{total reference area}}\right)$$

In addition to the homogeneous lacquer coverage, an error-free setting, e.g., of a powder lacquer layer, by means of the baking process is necessary for powder lacquers. Typically temperatures of 170° C. or more, preferably 180° C. or more, or temperatures of over 200° C. are required for this.

When baking the powder lacquer, the substrates are held at a high temperature for several minutes, for example 10 minutes or longer, in particular 20 minutes or longer, in order to complete the film formation and cross-linking of the powder lacquer. Drying steps may also be part of the lacquering process, in which the substrate is often pre-dried in advance at moderate temperatures of 80° C. to 150° C. Drying steps are preferably used in order to, for example, reduce or prevent an outgassing of volatile substances and in particular the release of residual moisture during the subsequent lacquer-baking process. The lacquering quality can be further improved if optimized powder lacquer systems, for example powder lacquers mixed with conventional degassing additives are used.

The advantage of substrates in accordance with the invention compared to untreated substrate base bodies or conventional substrates is now that, even in the case of an intense pre-drying or the use of dry substrates (e.g., with 0.5% by weight residual moisture or less, residual moisture or less, preferably with 0.3% by weight residual moisture or less) a perfect lacquer coverage, i.e., a homogeneous, covering powder application is possible.

Finally, the substrates in accordance with the invention are also directly recyclable. In addition to energetic or thermal recycling, this may also be a material recycling and/or a chemical recycling.

However, with the use of conventional conductive lacquers, i.e., coatings for increasing the electrical conductivity, problems may arise due to a low material compatibility. This often leads to adhesion problems with the conventional conductive lacquer on the substrate base bodies, for example with UV-hardening acrylate-based conductive lacquers that are applied to polyamide surfaces. Likewise, in the case of a possible subsequent material recycling of the substrate, adherent residue of a conventional conductive lacquer can interfere with the recycling of the substrate base bodies.

The good recyclability of the substrates in accordance with the invention results in particular also from the fact that the materials of the substrate base body and the coating are compatible and the coating applied to the substrate base body needs only to have a very small thickness in order to ensure an excellent lacquerability. The proportions of the additive of the coating in the total mass of the substrate in accordance with the invention are thus typically substantially negligible with respect to their impact on the heat conduction, even after being reused to produce a substrate base body. The additives and/or the matrix polymer may, from this perspective, be selected without problems in regard to the compatibility (e.g., mixability) with the material of the substrate.

The matrix polymer is preferably selected such that it is molecularly or microscopically mixable with the first polymer, wherein preferably the matrix polymer and the first polymer come from the same polymer group, and wherein particularly preferably the matrix polymer and the first polymer are of the same polymer type.

A polymer group is thereby constituted by a category of different polymers which differ, e.g., in molecular weight, in the arrangement or sequence of the repeat unit(s), but have the same categorization characteristics, e.g., a linking via amide or ester bonds in the polymer group of the polyamides or respectively the polyesters, or the structure of vinyl monomers as in the polymer group of the vinyl polymers.

Polymer types are individual polymers of a polymer group with a chemically well-defined structure (monomer, sequence) like, for example, polyamide 6, which is made from ε-Caprolactam. These may also differ, e.g., in molecular weight, in the arrangement and/or the sequence of the repeat unit(s).

In accordance with the invention, in particular the first polymer and the matrix polymer are selected from the polymer group polyamide (PA), polyester, polyether, polyketone, polyvinyl, polyolefin, polycarbonate, and copolymers and functionalized polymers thereof.

In the case of the polyvinyl polymers, in particular syndiotactic polystyrene (sPS) or a styrene copolymer like ABS (acrylonitrile butadiene styrene), ASA (acrylonitrile styrene acrylate) and/or SAN (styrene acrylonitrile) are suitable as the first polymer and matrix polymer.

Cases in which the first polymer and the matrix polymer are identical are preferred, though it may be desirable for certain applications to select as a coating a matrix polymer which deliberately has other properties. This may be a matrix polymer which, in comparison to the first polymer, differs, among other thing, with respect to the moisture absorption, the costs, the melting or softening point or range, the crystallization temperature, the crystallinity, the vapor and/or gas permeability.

Particularly preferably, in accordance with the present invention, the first polymer and/or the matrix polymer are selected from the polymer group of polyamides, wherein further preferably a) the first polymer is a polyamide 66, a polyamide 6, or a partially aromatic polyamide, and/or b) the matrix polymer is a polyamide 6, a polyamide 66, a polyamide 610, or a polyamide 410.

Preferred pairings of first polymer and matrix polymer are:

first polymer and matrix polymer: polyamide; solvents in the coating composition: cresol and/or methane acid;

first polymer and matrix polymer: polyester; solvents in the coating composition: cresol;

first polymer and polymer matrix: syndiotactic polystyrene; solvents in the coating composition: organic solvent, e.g., toluene, ethylacetate.

first polymer and matrix polymer: polycarbonate; solvents in the coating composition: organic solvents, e.g., dichloromethane.

Particularly preferable pairings are:

First polymer: polyamide 66 (PA66);

Matrix polymer: polyamide 6 (PA6) or polyamide 66;

Solvents in the coating composition: methane acid or preparations based thereon.

Suitable to the matrix polymer and to the first polymer of the substrate base body, a solvent is selected which is used as a processing agent in the coating composition. The solvent may thereby be a liquid chemical pure substance, for example an organic liquid (chemical, organic compound in liquid form) or a mixture of such pure substances. The solvent is used to set up an applicable form of the coating composition, containing the matrix polymer, and of the additive for reducing the surface resistance. The solvent, optionally in the form of a solvent mixture, may thereby also be used at an increased temperature, in the extreme case even up to the boiling point or decomposition point.

The solvent can be removed from the coating, preferably without residue, for example by ventilation, neutralization, decomposition, or being washed out, and is thereby ideally cost-effective, environmentally friendly, easy to handle, non-toxic and does negatively affect the processing processes or the characteristics of the product. Organic solvents are preferred.

Preferably, the first polymer and the matrix polymer are soluble in the same solvent or in the solvent contained in the coating composition. In the case that the first polymer has a very high molecular weight or is present in a (partially) cross-linked form, the first polymer should preferably be swellable, at least by absorbing the selected solvent.

Preferred solvents are—depending on the polymer—different organic liquids, in particular aromatic hydrocarbons and/or carboxylated hydrocarbons, inorganic acids, mineral acids and mixtures of the aforementioned substances and aqueous solutions thereof. Halogenated liquid compounds are also useable, for example halogenated acetic acid (trichloroacetic acid, trifluoroacetic acid), hexafluoroisopropanol or dichloromethane and mixtures of these liquids useable as solvents. In the case of the aromatic hydrocarbons, cresol, xylene and toluene are particularly preferable. In the case of the carboxylated carbons, methane acid and acetic acid are particularly preferable. In the case of the mineral acids, sulfuric acid and phosphoric acid are particularly preferable. Furthermore, organic esters, ethers, alcohols, aldehydes, ketones, or carbonates are usable, like, for example, ethylacetate, butylacetate, tetrahydrofuran, dioxane, ethanal, butanone and propylene carbonate, and mixtures thereof.

The coating preparations in accordance with the invention may easily be formulated such that they are able to be applied even to complex contours of the substrate base bodies, in particular by means of spraying, pressing, stamping, casting, brushing, a doctor blade, by means of transfer rollers, etc.

The solvent contributes in particular to the composition of the coating—in particular the matrix polymer—firmly bonding to the material of the substrate base body—the first polymer—for example through inter-diffusion of chain molecules.

Methane acid or a mixture that contains methane acid (e.g., with 50% by weight methane acid or more) is a particularly preferable constituent part or solvent for the coating composition, because methane acid is sufficiently volatile, can be removed without residue, and is capable of dissolving or partially dissolving or swelling a wide range of polymers (in particular polyamides).

In particular embodiments of the invention, the first polymer is present in the polymeric material as a blend with a second polymer. Particularly preferable in this case are blend with a continuous phase of polyamide and, e.g., polyphenylene ether (PPE) or polystyrene (PS) or PS-containing copolymers or polyacrylates or polyolefins as a dispersed, discontinuous phase, because the aforementioned preferred pairings of first polymer and matrix polymer may hereby also be used for polyamides.

In preferred embodiments of the invention, the polymeric material of the substrate base body comprises reinforcing substances, in particular selected from particulate and fibrous reinforcing substances, further preferably selected from glass spheres, hollow glass spheres, glass fibers, carbon fibers, ceramic fibers, ceramic particles, or polymeric fibers. Ground glass particles are also suitable as a particulate reinforcing substance in substrate base bodies in accordance with the invention.

The additive for reducing the surface resistance of the coating is preferably selected from electrically non-insulating materials, and especially selected from carbon-based components, in particular conductive soot, carbon nanotubes (CNT), carbon fibers, carbon layered materials, in particular graphite, graphene, and graphene oxide, electrically conductive ceramic, in particular semi-conductive tin oxides, electrically conductive organic compounds, conductive polymers, metal powders, and metal fibers. It is hereby important to select a respective concentration of the additive which results in a sufficient electrical conductivity of the coating, for example by forming a percolation structure and thus enables the reduction of the electrical resistance in the target range (i.e., a specific surface resistance of $10^{10}$ Ohm or less). This concentration depends, among other things, on the shape, alignment or intrinsic conductivity of the particulate material (particles, fibers etc.) of the additive.

Conductive soot, CNT or carbon fibers as a chemically inert electrically conductive additive is particularly preferable as the additive for reducing the surface resistance.

In the case of the semi-conductive tin oxides, in particular the indium-doped and the fluorine-doped tin oxide (ITO and FTO, respectively) are preferred.

The specific surface resistance of the coating of the substrate base body in accordance with the invention can be varied not only by the selection of the additive, but also by the variation the content thereof in the coating.

The particle size of the additive for reducing the surface resistance must be adapted to the respective coating composition used, the application process, and the desired properties of the coating (layer thickness, homogeneity, dry basis weight, conductivity etc.).

When applying the coating composition by means of spraying, the diameter of the spray nozzle, for example, predetermines the maximum particle size.

Particles with an average diameter (median value) of 50 µm or less are preferable, particles with an average diameter (median value) of 10 µm are particularly preferable. The median value can be determined by manually measuring electron microscope images. The length of the particles may thereby reach a multiple of the diameter of the particles, in particular if fibrous additives like carbon fibers or CNT are used. Nanoparticles are further preferable.

The quotient of the length of the particle and the diameter thereof expresses the aspect ratio. A high aspect ratio is preferable because hereby the probability of the formation of a so-called percolation path for dissipating electrical charge increases and thus the additive concentration may optionally be reduced.

The aspect ratio A is thereby defined by the quotient of the length L in a spatial direction, for example x or y, and the thickness D (e.g., of platelet-like particles or of rod-like or fibrous particles) in a spatial direction z perpendicular to x or y. This results in the relationship $$A=L/D.$$

For example, carbon fibers, e.g., ground or cut carbon fibers with a thickness of about 5 µm to about 10 µm and lengths of several hundred µm to a few mm may be used, wherein it may result in up to four-digit aspect ratios. Conductive soot may also be used; in this case, there are oblong branched superstructures (aggregates and agglomerates) of primary particles, wherein the superstructures have a length of a few hundred nm to several µm and the primary particles themselves are substantially spherical and have a diameter of about 100 nm or less.

The coating on the surface region of the substrate preferably has an average observable thickness of about 100 µm or less, in particular about 0.1 µm to about 50 µm, further preferably about 0.1 µm to about 25 µm. Some fluctuation in the layer thickness can be tolerated, because this usually does not disrupt the function and visual appearance.

The coating applied in accordance with the invention to the surface region of the substrate may be configured in a variety of ways, in particular as a continuous, full-area, or large-area coating. The coating may be applied to the substrate base body on one side, multiple sides, or on all sides.

It is also possible, however, for a surface not visible in the end application to be equipped with the coating in accordance with the invention, in particular the rear side of a substrate base body or interior regions like hollow chambers in hollow (chamber) profiles, because the electrostatic effects that are present can also act over small distances of a few millimeters and even through the substrate body and make the then uncoated viewing side electrostatically lacquerable.

Small-area coatings applied at points, in lines or in regions may be important for certain applications. The coating may also be applied in the form of patterns, numbers, symbols, drawings or letters; this is then used to enable, for example, decorating the substrates in a specific way. Here, the coating is then selectively applied to one or a plurality of predetermined surface region(s) of the substrate base body which is/are provided for a subsequent electrostatic coating, in particular a powder lacquering, or which extends/extend substantially in parallel to a surface region of the substrate which is provided for an electrostatic coating, in particular a powder lacquering.

Concrete structures, for example conductor tracks, can thus likewise be printed on substrates which thereafter, even after a lacquering process, can serve to produce an electronic component from the substrate itself. It is thus possible, e.g., to retroactively integrate components (switches, light-emitting diodes, transmitter/receiver modules, actuators, peltier elements, piezo elements, solar cells, power store sensors for moisture, temperature, vibration/sound, pressure/tension or further electrotechnical components) on an insulating profile equipped in that way with printed conductor tracks, so as to produce so-called intelligent or electronically functionalized insulating profiles. An electrical contacting of the metal half shells (e.g., the inner and outer aluminum half shell of an aluminum window) for current or signal transmission is then advantageous in this case.

The present invention is of particular importance for substrates which are configured as heat-insulating profiles, in particular for the production of window, door, roof, or facade elements. The substrates may in particular comprise a hollow profile or porous or partially porous profiles as substrate base bodies. In the applications described above, these heat-insulating profiles are often fixedly connected to the metal profiles (e.g., aluminum frame profiles).

The present invention can generally be implemented with a substrate that is designed as a moulded part for an application outdoors, in particular as a moulded part with the function of a holding element, decorative element, or a covering element.

By way of the matrix polymer used, the additive, and the composition of the coating, the weathering and/or UV-stability can be increased, such that the products in accordance with the invention have a significantly improved stability in these use scenarios.

Of particular importance in accordance with the invention as substrates are: moulded parts with the function of a holding element or covering element in the field of plant technology for renewable energies, for example wind power, solar energy, hydroelectric plants, or also in the field of automotive engineering, transportation, for garden equipment and for sports and leisure equipment or for enclosures for electrical or electronic equipment and devices. In particular attachment parts for means of transportation (passenger car, motor-cycle, bicycle, scooter, etc.) like, e.g., bumpers, hubcaps, fenders, hoods, doors, hatches, flaps are preferred.

Matrix polymers that withstand the lacquering processes described in the following without significant decomposition are preferred in accordance with the invention. In powder lacquering processes, substrates are typically subjected to temperatures of about 200° C. for several minutes, and for this reason a temperature stability of about 200° C. or more, preferably about 250° C. or more, is desired. The substrate must be sufficiently dimensionally stable at these temperatures so that the further usability of the coated and lacquered substrates, as well as the functionality of the products produced therefrom, continues to be maintained.

In addition, lacquering processes are also known which must take place at higher temperatures, these are typically lacquering systems for high-end applications, e.g., polyvinylidene fluoride (PVDF) powder lacquers. It is obvious that the temperature stability and dimensional stability of the substrate must be adapted for these processes, as is familiar to the person skilled in the art.

Temperature stability is understood not only as the melting or softening point or range of a polymer, but rather the temperature up to which the polymer is sufficiently stable with respect to thermal decomposition (depolymerisation, thermolysis, thermooxidation, hydrolysis, outgassing etc.). Measurable parameters for testing the temperature stability are, for example, the mass loss by means of thermogravimetry, the oxidation induction time or the determination of mechanical parameter, e.g., impact strength, bending, tensile or peel strength, where this is possible. The testing scenarios should appropriately reflect the stress in the lacquering process (baking temperatures, holding times, atmosphere etc.). This may be, e.g., for above-mentioned heat-insulating webs (insulating profile made of a polymeric material containing polyamide 66 (PA66) or with a matrix of PA66), a thermogravimetric measurement (TGA) of air, which provides for a temperature program with a holding time of about 20 minutes at 220° C. The mass loss (without moisture release) should thereby be less than about 5% by weight, preferably less than 2% by weight.

The coating and the matrix polymer should also be sufficiently thermally stable, though there are no high demands on the mechanical strength, because the substrate base body is typically load-bearing.

In accordance with the invention, coatings with a reduced specific surface resistance are also preferred, which are UV-stable and/or weather resistant. Testing scenarios are described, e.g., in DIN EN ISO 4892. Coatings considered to be UV-stable or weather resistant within the meaning of the present invention are those which have properties relevant for an application (e.g., impact resistance, strength, degree of gloss, surface roughness, cracking and fracture tendency) that do not or only minimally degrade after UV exposure or weathering. Hereby, in particular degradation of up to 20% (in relation to the initial properties) is considered to be minor degradation, i.e., UV-stable or weather-resistant products retain 80% of the initial properties or more after completed (UV-)weathering. The duration of a UV-exposure or weathering is selected appropriately according to an application; this may be, e.g., 300 hours, 500 hours, or 600 hours or longer.

For example polyamide polymers with conductive soot as an additive for reducing the surface resistance, e.g., with a proportion of about 5% by weight of soot in the surface layer, have proven to be particularly UV-stable.

The invention relates further to substrates with a lacquer layer or a powder lacquer layer, which in particular has a layer thickness in the range of about 10 µm to about 300 µm, preferably about 30 µm to about 200 µm, more preferably about 50 µm to about 200 µm.

A further aspect of the present invention relates to a method for producing electrostatically lacquerable, in particular powder lacquerable polymer-based substrates with the features of claim 19.

The method in accordance with the invention comprises:
providing a substrate base body made using a polymeric material, wherein the polymeric material comprises a first polymer,
providing a coating composition, comprising a solvent, a matrix polymer dissolved in the solvent, and an additive reducing the electrical resistance, wherein the solvent is selected such that the first polymer is soluble or swellable in the solvent, wherein the matrix polymer is compatible with the first polymer, and wherein the additive is dispersed in the coating composition, applying the coating composition to a surface region of the substrate base body to form a surface layer, and removing the solvent from the surface layer.

The coating composition used in accordance with the invention can be applied uniformly and thinly to arbitrarily complex surface structures, for example by means of spraying, pressing, stamping, casting, brushing, a doctor blade, dipping, and by means of transfer rollers.

The required viscosity of the coating composition for the respective processing can be set in a simple manner by way of the proportions of dissolved polymer. Higher proportions of dissolved polymers or smaller proportions of solvents increase the viscosity. Further additives may also be added in a targeted manner, these being, in addition to the electrically conductive additives, rheologically active additives, dispersive additives (e.g., soaps, silicas, polyelectrolytes) or functional additives such as, e.g., flame retardant additives (metal oxide hydroxide, organic and/or halogenated flame retardants) or formula-cheapening fillers (e.g., silicon oxide, glass powder, talcum, plaster, chalk etc.). Dispersants are thereby used primarily in order to keep finely dispersed electrically conductive additives in a stable dispersion in the solvent until the coating has taken place.

Coloring additives like pigments, effect pigments, dyes, or fluorescent dyes that can be used in a coating composition in order to take on, among other things, a decorative function or to serve to create copy protection features are of particular importance.

The solvent proportion in the coating composition used in accordance with the invention contributes to the coating being firmly bonded to the surface of the substrate base body. This occurs through the formation of a molecular or microscopic mixture of the matrix polymer and the first polymer of the substrate base body. This mixture can thereby spontaneously form without further intervention, for example by means of diffusion or interdiffusion of molecular chains of the dissolved polymers of the matrix polymer and of the first polymer.

In accordance with the invention, the coating produces a new surface on the substrate base body, which, for example, is free of lubricant or has a higher roughness or adhesion-optimizing components (e.g., further additives or functionalized polymers), such that an improved adhesion of the powder lacquers to the surface is thereby achieved. A separate post-treatment of the surface of the coating may therefore be omitted before the powder coating, which acts to reduce costs in the entire further processing.

Furthermore, it is frequently sufficient to apply the coating composition in small layer thicknesses so that the geometry of the substrate bodies, in particular the wall thickness thereof, is only slightly changed and the heat-insulating properties of the substrate base bodies remains nearly unchanged.

At the same time, the application of the coating composition in accordance with the invention to a surface region of the substrate base body can improve the visual appearance thereof. It is thus possible to create, in particular, a new surface, which is visually perceivable to be homogeneous, and which, e.g., then may be homogeneous matte black over a large area (i.e., with a low level of gloss, preferable a gloss level of 30% or less, particularly preferably a gloss level of 10% or less).

The solubility of the first polymer in the solvent is achieved within the meaning of the present invention in particular when the solvent can convert significant proportions of the first polymer into a dissolved or dispersed state, e.g., about 10% by weight or more of the first polymer is soluble in a solvent, or about 50% by weight or more of the first polymer is soluble in a solvent. Particularly preferably, about 98% by weight or more of the first polymer is soluble in a solvent.

The solubility of polymers in a solvent is typically accompanied by an increase in the viscosity of the liquid phase, i.e., of the resulting solution, and thus can also be tested in this way.

Further preferably, the first polymer is swellable in contact with the solvent, at least to an extent that the polymer absorbs about 50 g of solvent or more per 100 g of polymer while swelling.

The removal of the solvent from the surface layer can be implemented using different methods, in particular by means of evaporation and/or vaporization and/or by conversion into highly volatile gaseous products (decomposition, transformation), the volatility of the solvent or the decomposition rate thereof preferably being increased. This may be effected by lowering the ambient pressure and/or by increasing the temperature, in particular by means of the use of a vacuum chamber, of radiant heaters, fan heaters etc.

Alternatively, the solvent may be washed out: A washing process that removes the solvent from the solvent-containing substrate preferably uses an agent which is mixable with the solvent (second solvent or a preparation, e.g., a neutralization solution), wherein this agent should be a non-solvent for the matrix polymer. Water or aqueous solutions are particularly preferred as the agent. By means of such a water-based neutralizing and/or washing process, coated substrates can be removed particularly well from, among other things, inorganic acids, should these be used as solvents in coating compositions.

In accordance with the invention, the solvent is preferably selected such that the solubility of the matrix polymer in the solvent is about 1 g/l or more, preferably about 5 g/l or more, particularly preferably about 50 g/l or more. This enables the use of sufficiently highly concentrated coating compositions and reduces the effort in removing the solvent at the end of the coating process.

Further preferably, the solvent is selected from volatile chemical liquid compounds which in particular at 1 atm have a boiling point or decomposition point of about 210° C. or less, particularly preferably a boiling point or decomposition point of about 120° C. or less.

In the method in accordance with the invention, the first polymer is preferably selected from polyamide, polyester, polyether, polyketone, polyolefin, polyvinyl, and copolymers and functionalized polymers thereof.

The matrix polymer is preferably selected from polyamide, polyester, polyether, polyketone, polyolefin, and polyvinyl.

An organic liquid ("organic solvent") is preferred as a solvent, further preferably an aromatic hydrocarbon, in particular cresol, xylene or toluene, and/or carboxylated hydrocarbons, preferably methane acid or acetic acid, or an inorganic acid, in particular sulfuric acid, phosphoric acid and mixtures thereof with further liquids, or a preparation made therefrom, for example a neutralization solution and/or aqueous solutions thereof, is used, wherein the additive reducing the electrical resistance is distributed in the matrix polymer, in particular homogeneously.

The method in accordance with the invention includes, according to a further aspect of the present invention, after applying the coating to a surface region of the substrate base body, the electrostatic application of a lacquer, in particular a powder lacquer, wherein the powder lacquer is preferably baked at a temperature of about 170° C. or more, wherein a lacquer adhesion to the surface region of the substrate is achieved which, after a cross-cut test according to DIN EN ISO 2409, preferably results in a cross-cut value of 0, 1, or 2, particularly preferably a cross-cut value of 0 or 1. More preferably a homogeneous lacquer coverage is achieved.

The substrates in accordance with the invention are preferably subjected to drying steps before the electrostatic powder lacquering in order to, e.g., first expel volatile substances and thus reduce or prevent an outgassing of volatile substances and in particular the release of residual moisture during the subsequent lacquer baking process.

High lacquer coverage rates, e.g., with the use of standard powder lacquer systems, can be achieved in a reproducible and process-stable manner in particular when the substrates are dry, i.e., the residual moisture in the substrate base body is about 0.5% by weight or less, in particular about 0.3% by weight or less. This property is particularly important for the lacquering processes of hygroscopic polymeric materials (e.g., polyamide-based materials), because while dry polyamide materials without special equipment show no or hardly any bubble formation, they yield only low lacquer coverage rates.

The coating in accordance with the invention may often be permeable by diffusion, though in exceptional cases it is also possible and sensible to create a diffusion barrier, e.g., for water vapor, by way of additives in a coating composition. Hereby, it is preferable to select platelet-like fillers with a high aspect ratio, said fillers may be selected from, e.g., graphite, delaminated/exfoliated graphite, graphene, graphene oxide, layered silicates (inorganic or organophilic), layered inorganic sulfides or layered inorganic oxides (e.g., layered double hydroxides).

These and further advantages and advantageous embodiments of the present invention become clear from the following description of the figures and examples.

BRIEF DESCRIPTION OF THE DRAWINGS

In the drawings:

FIGS. 2A to 2D show two embodiments of a substrate in accordance with the invention before and after a powder lacquering;

DETAILED DESCRIPTION OF THE DRAWINGS

FIGS. 1A to 1D shows a substrate base body 10 in the form of a so-called offset insulating profile in cross section perpendicular to the longitudinal direction thereof.

The cross section has on both sides of a planar middle section 12 offset regions 14, 16, the free rims of which are configured as so-called roll-in projections 18, 20. The roll-in projections can be guided into corresponding recesses of metal profiles and be connected to the metal profile in a shear-resistant manner by means of a so-called "roll-in process".

The substrate base body 10 is typically made of a polymeric material, for example based on polyamide as the first polymer.

Figure 1A:
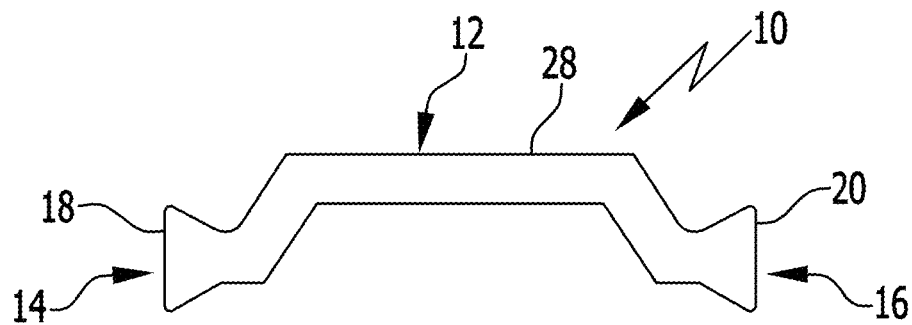
FIGS. 1A to 1D show a schematic depiction of the production of a substrate in accordance with the invention with a surface coating.
Figure 1B:
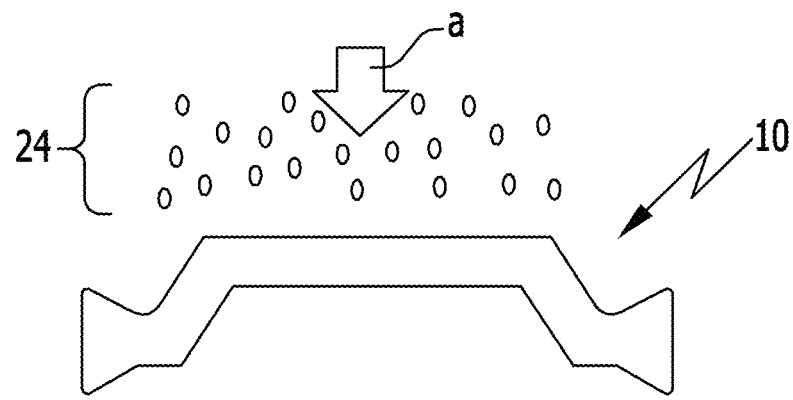

FIG. 1B shows schematically the process of applying a coating in accordance with the present invention for producing a surface with a specific surface resistance of $10^{10}$ Ohm or less.

The process of applying the coating is implemented here with spray technique, symbolized by a spray 24 which is applied in the direction of the arrow a to the surface of the insulating profile 10 located on top (viewing side 28) in FIGS. 1A to 1D.

The surface layer may be applied, for example, as a dispersion of conductive soot in a solution of polyamide 6 (PA6) in methane acid.

Figure 1C:
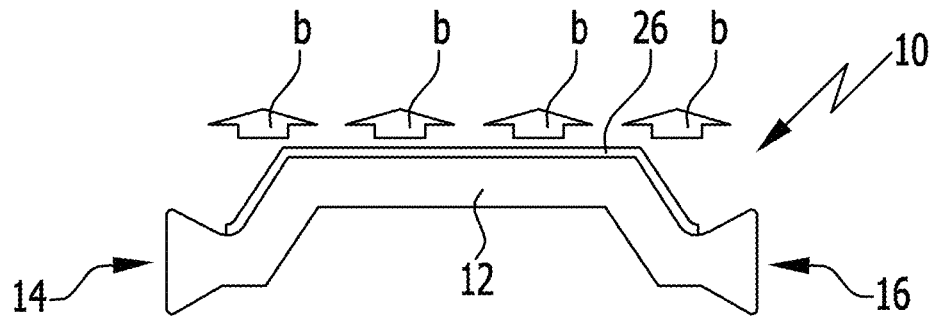

It can be seen in FIG. 1C that a surface layer 26 extending over the middle section 12 and into the offset regions 14, 16 has formed on the substrate body (insulating profile) 10, which surface layer 26 is subjected to a drying in the step symbolized in FIG. 1C, in which solvent components of the sprayed-on coating mass (see arrows b) are removed.

Figure 1D:
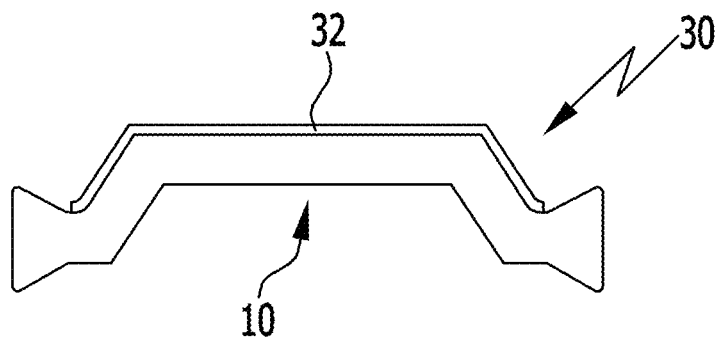

In FIG. 1D, the finished substrate 30 in accordance with the invention is then formed, in which the substrate base body 10 is provided with a coating 32 that has a specific surface resistance of about $10^{10}$ Ohm or less.

This substrate shape shown in FIGS. 1A to 1D provides an example of a simple profile geometry without hollow chambers, undercuts or the like, though it is explicitly noted that the model of FIGS. 1A to 1D is useable on many further, among other things highly complex profiles or moulded parts with three-dimensional structures.

In FIGS. 2A to 2D, two polymer-based substrates in accordance with the invention are depicted in FIGS. 2A and 2C, which subsequently are electrostatically coated with a powder lacquer layer (shown in FIGS. 2B and 2D). Here, too, the cross section is seen in each case perpendicularly to the longitudinal direction of the composite profiles.

In FIG. 2A, a portion of a metal-plastic profile 40 is shown which is formed from a polymer-based substrate 42 and respective metal profiles 44, 46 attached to the rims thereof. The polymer-based substrate 42 is again configured as an insulating profile with roll-in projections 48, 50 moulded offset on both sides, which are inserted into respective complementarily formed roll-in grooves 52, 54 of the metal profiles 44, 46.

The substrate 42 (insulating profile) in accordance with the invention has on its upper surface which is accessible here from the outside, in accordance with the invention, a coating 56 which extends, analogously to FIG. 1D, over the surface region of the insulating profile 42 located on top in FIG. 2A, namely up to the roll-in projections 48 and 50 of the insulating profile 42.

When rolling the roll-in profiles 48, 50 into the roll-in grooves 52, 54 of the metal parts 44, 46, a conductive contact with the coating 56 is produced, such that an electrostatic powder coating of a particularly high quality can be applied here.

The situation after the powder lacquering of the dry substrates is depicted in FIG. 2B, in which a powder lacquer layer 60 extends from the face side of the metal profile 44 over the surface of the coating 56 of the insulating profile 42 up to the face side of the second metal profile 46.

The electrostatically applied lacquer layer 60 is in particular very uniform and free of bubbles and has a high lacquer coverage rate.

FIG. 2C shows the section of a composite profile 70 with a polymer-based insulating profile 72 that is gripped on both sides by metal profiles 74, 76 by means of a roll-in connection. Roll-in projections 78, 80 of the insulating profile (substrate) 72 are hereby inserted into corresponding roll-in grooves 82, 84 of the metal profiles 74 and 76, respectively.

In contrast to the depiction of FIG. 2A, in this embodiment a coating 86, applied to the substrate base body 73 in accordance with the invention, with a reduced specific surface resistance is placed not on the viewing side but rather on the rear side. The coating 86 in turn is in electrically conductive contact with the metal profiles 74, 76 by the coating 86 extending up to the roll-in projections and thus coming into contact with the metal profiles 74 and 76, respectively, in the roll-in grooves 82, 84.

A powder lacquer layer 90 is again applied here on the viewing side. Said layer extends again from the face side of the first metal profile 74 over to the insulating profile 72 to the face side of the second metal profile 76. By means of the coating 86 with a reduced specific surface resistance of $10^{10}$ Ohm or less, applied in accordance with the invention to the substrate base body, the prerequisite is again met so that a continuous, flawless lacquer layer 90, which abuts directly against the substrate base body 73 in the region between the metal profiles 74, 76, can be applied to the viewing side of the composite profile 72.

FIGS. 3A to 3F shows with its examples in sub-FIGS. 3A to 3F different substrates in accordance with the invention (each in a cross section perpendicular to the longitudinal direction) which have different configurations of coatings applied in accordance with the invention on the respective substrate base body 100, which has the shape of an offset insulating profile.

The substrate base body 100 has, in addition to a middle planar section 102, laterally adjoining offset regions 104, 106, which are then each adjoined by so-called roll-in projections 108 and 110, respectively.

Figure 3A:
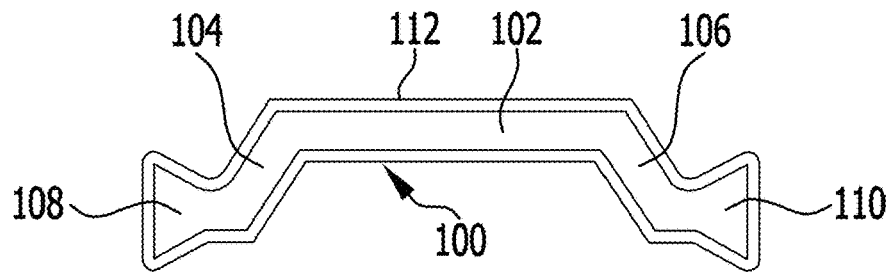
FIGS. 3A to 3F show a plurality of embodiments of substrates in accordance with the invention.
Figure 3B:
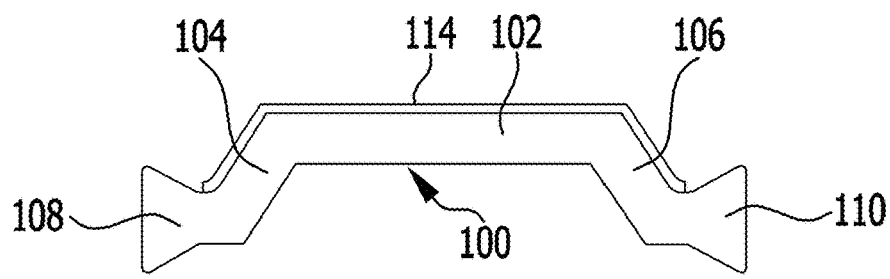

The substrate base body 100 of FIG. 3A is provided with a coating 112 which wraps completely around in the circumferential direction and which extends not only on both sides of the middle section 102, but also around the offset regions 104, 106 and the roll-in projections 108 and 110.

In FIG. 3B again the substrate base body 100 is shown, in which the coating 114 to be applied in accordance with the invention extends only on one side of the middle section 102 and into the adjoining offset regions 104, 106 (in each case also only on one side). Thus in FIG. 3B there is a coating on the substrate base body 100, similar to what was described in connection with FIG. 1D.

Figure 3C:
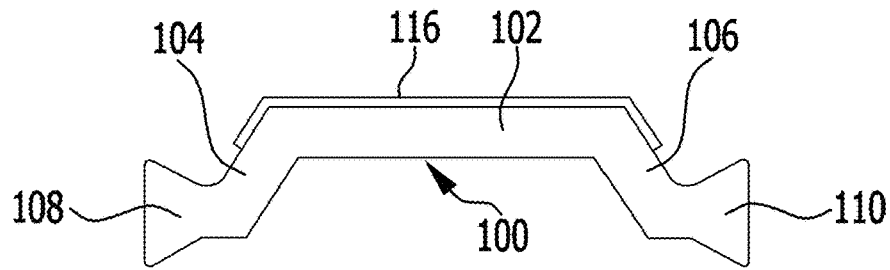

In FIG. 3C, a coating 116 is applied to the base body 100 in the middle section 102 on one side, said coating 116 extending on both sides of the planar middle section 102 partially into the offset regions 104, 106 (also only on one side). The further surface regions of the offset sections 104, 106 and the roll-in projections 108, 110 remain coating-free.

Figure 3D:
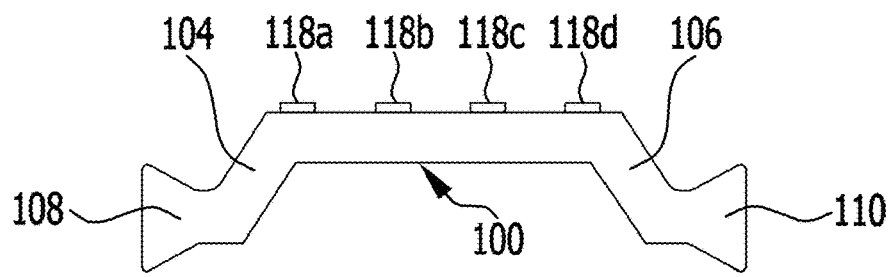

In a further variant, shown in FIG. 3D is the selective application of a coating, wherein the coating has been divided here into four parallel strips or webs 118a, 118b, 118c, 118d, which all extend on the upper surface of the middle section 102 of the substrate base body 100.

Figure 3E:
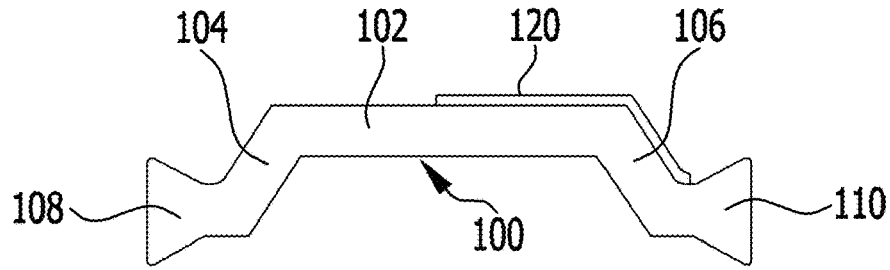

Another variant of the selective coating of the substrate base body 100 is shown in FIG. 3E, a coating 120 applied in accordance with the invention extending here approximately over half of the one surface of the middle section 102 and over the offset region 106 (on one side).

Figure 3F:
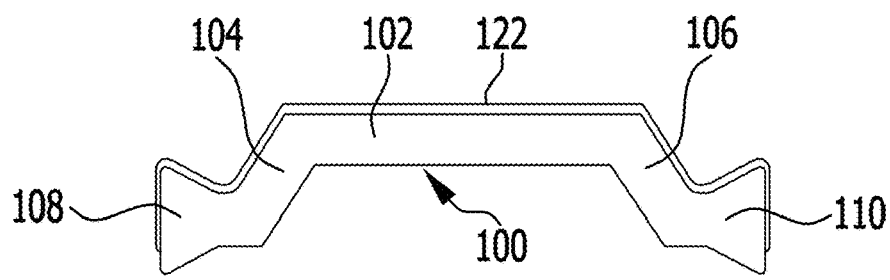

In the sixth example of FIGS. 3A to 3F, a substrate in accordance with the invention is shown in FIG. 3F, in which the substrate base body 100 is provided with a coating 122 that extends both on a surface of the middle section 102, over the entire offset regions 104, 106 (on one side), and into the regions of the roll-in projections 108, 110.

In each of the embodiments of FIGS. 3A, 3B, 3E, and 3F, it is possible to bring the coating 112, 114, 120 and 122, respectively, applied in accordance with the invention into contact with the metal profiles when rolling in the roll-in projections 108, 110, such that they may act in a dissipative manner during the electrostatic powder coating.

In the other embodiments of FIGS. 3C and 3D, there is no such dissipative contacting of the metal profiles, such that a capacitive effect comes into play here. Moreover, in FIG. 3D there may be an electrically conductive connection of the separate webs (not shown).

In FIGS. 4A to 4D, further embodiments are shown, which is meant to illustrate by way of example the possibility of selectively applying a coating in accordance with the invention to a substrate base body.

Figure 4A:
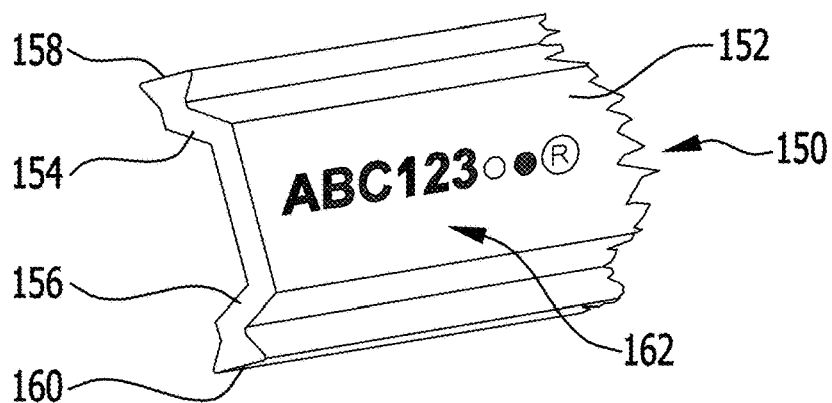
FIGS. 4A to 4D show further embodiments of substrates in accordance with the invention.

In FIG. 4A, a base body 150 is shown with a planar middle section 152, laterally adjoining offset regions 154, 156, and roll-in projections 158, 160 moulded thereon. On the top surface of the middle section 152, a coating in accordance with the invention is selectively applied in the form of the letters ABC and the numbers 123, a circle, a dot, and the symbol ®, which are together referred to with the reference numeral 162.

The lettering "ABC 123 ○ ● ®" serves only as an example of any labeling that could be applied in this way to the surface of the middle section 152, optionally also on other surface regions of a substrate base body 150, by means of the coating in accordance with the invention. Typically, e.g., suitable printer systems, stamps, or stencils are used for this purpose.

Figure 4B:
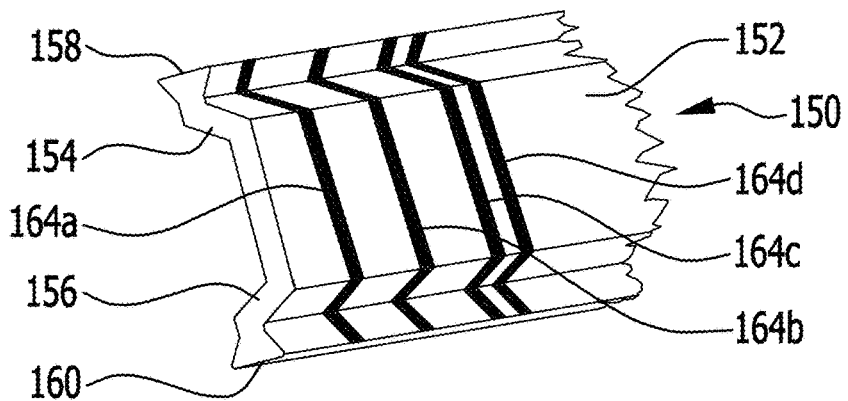
Figure 4C:
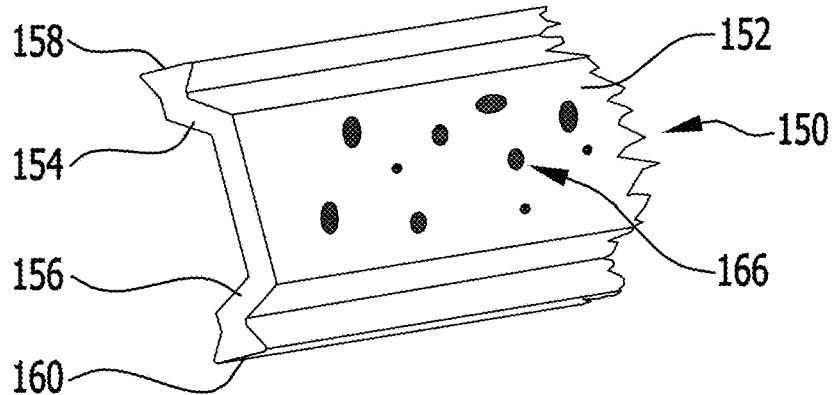
Figure 4D:
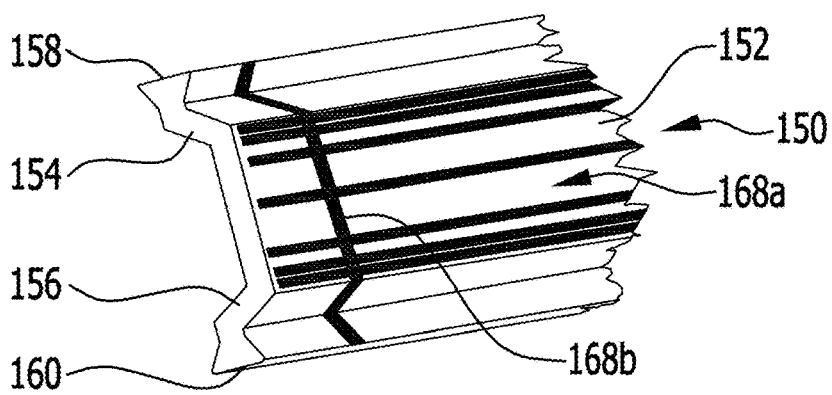

In FIG. 4B, a coating with a plurality of strips 164a, 164b, 164c, 164d is applied to the base body 150, wherein the strip-shaped coatings 164a, 164b, 164c, 164d extend on the side located on top in the figure from the roll-in projection 158 over the offset region 154, the planar middle region 152 into the offset region 156 and the roll-in projection 160.

Here, too, there is the possibility of electrical dissipation via metal profiles (not shown) in the rolled-in state of the substrate base body 150 in an electrostatic powder lacquering.

In FIGS. 4A to 4D the coating is again limited to the top region of the middle section 152 of the substrate base body 150, wherein arbitrarily arranged round to oval, island-shaped surface regions, are shown here with the reference numeral 166, which may stand for any other small-scale patterns. Within the island-shaped surface regions, the coating works by means of a capacitive mechanism.

Finally, in FIG. 4D, the coating is again applied in a web- or strip-shaped manner, wherein a first strip patterns 168a extends on the surface of the middle section 152 in the longitudinal direction of the substrate base body 150, while a further element 168b extends perpendicularly to the longitudinal strips of the pattern 168a from the roll in projection 158 over the offset region 154, the middle section 152, the offset region 156 to the roll in projection 160.

Because the coating region 168b extends transversely over all strip-shaped sections of the pattern 168a, a dissipating function can again be ensured when the base body 150 is present with metal profiles in the roll-in composite.

Figure 5A:
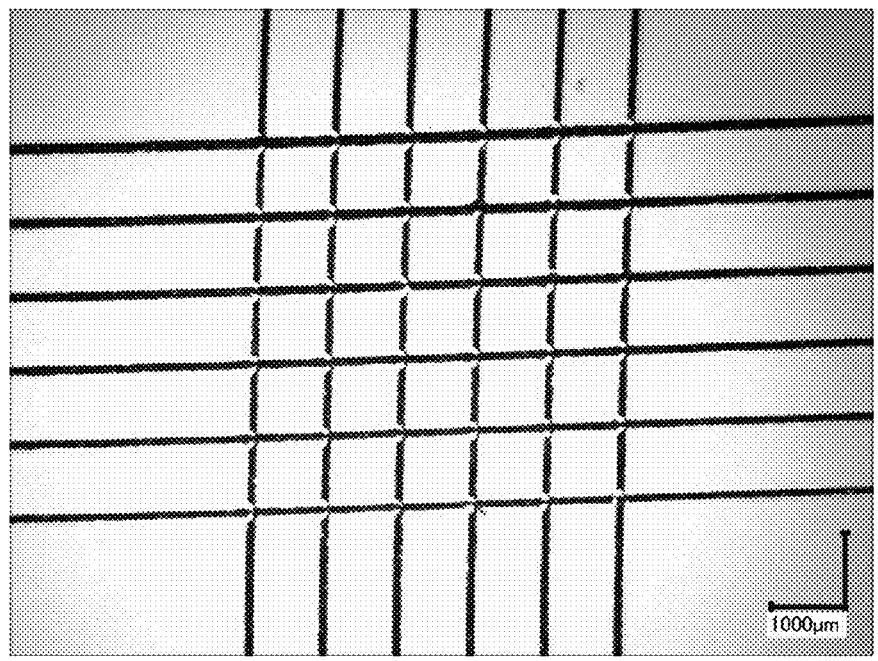
FIGS. 5A and 5B show the test result of a powder lacquered substrate in accordance with the invention by means of cross-cut lines in different magnifications.
Figure 5B:
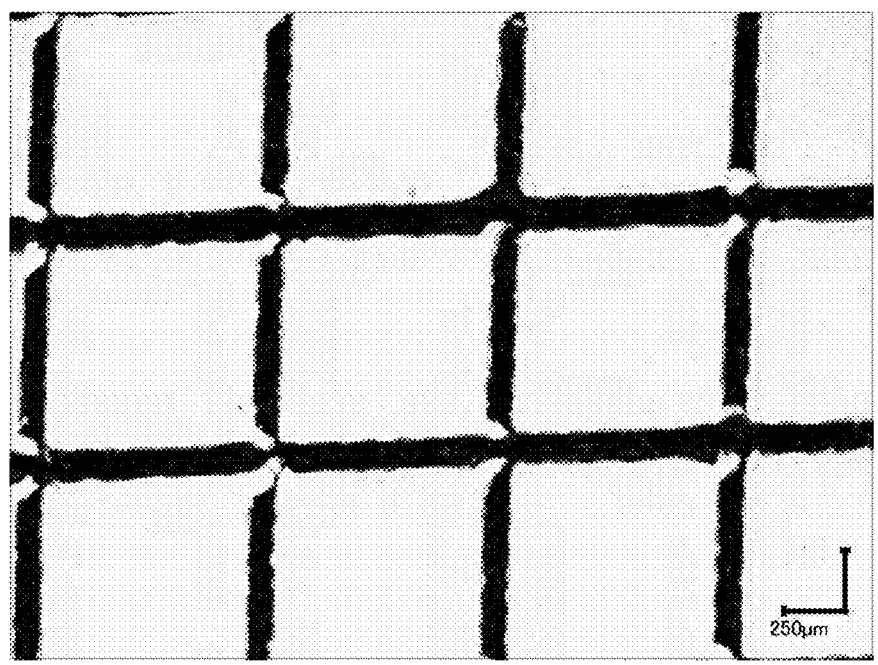

In FIGS. 5A to 5B a light-microscopic image of a profile equipped in accordance with the invention is shown, which was subsequently powder lacquered according to Example 6 described in the following.

The cross-cut test was performed on this sample. FIGS. 5A and 5B show the result at different magnifications (FIG. 5A: 30×, FIG. 5B: 100×). There is a cross-cut value of "0", i.e., clear cuts without the light powder lacquer chipping off of the dark surface of the substrate base body; the lacquer adhesion is thus considered to be perfect.

Figure 6A:
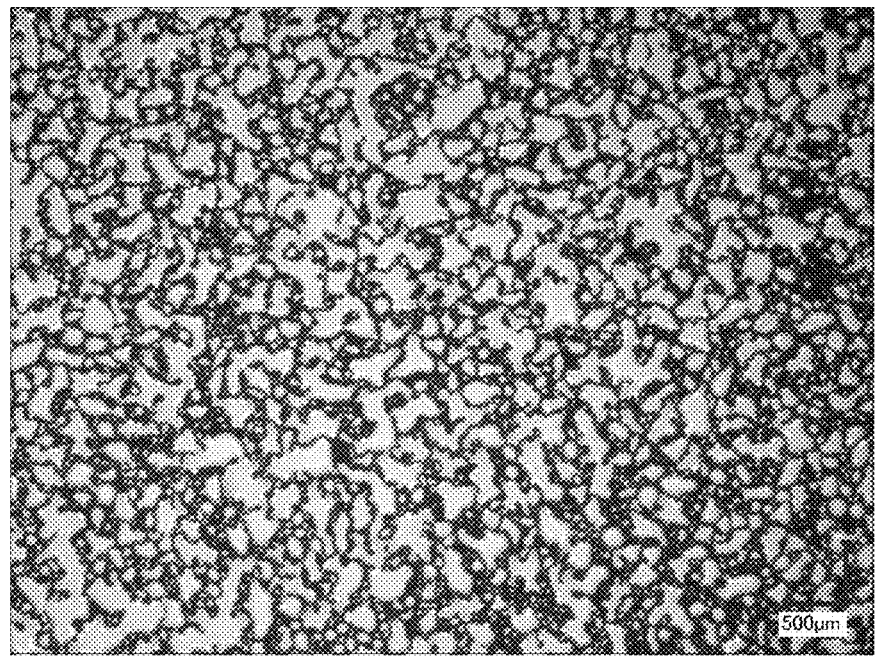
FIGS. 6A and 6B show a powder lacquered substrate with insufficient lacquer coverage.
Figure 6B:
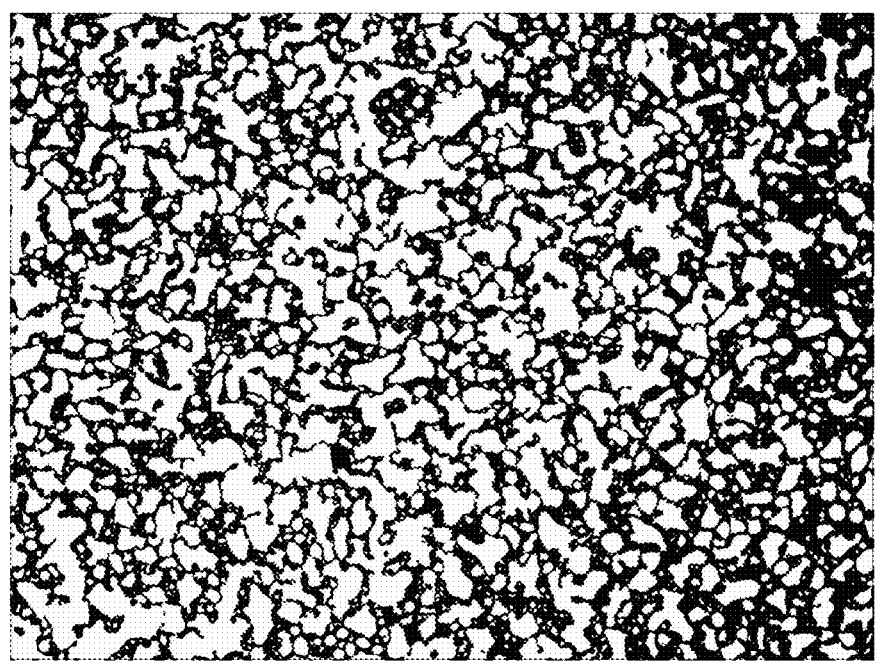

Shown in the illustrations of FIGS. 6A to 6B are light-microscopic images of the lacquering result after powder lacquering a profile in accordance with Example 3 described in the following (FIG. 6A). The image was taken at 50× magnification. FIG. 6B shows a black and white variant of FIG. 6A, which was obtained by means of a digital image conversion and serves as the basis for a determination of the lacquer coverage rate. A lacquer coverage rate of about 56% can be determined on the basis of FIG. 6B.

Figure 7A:
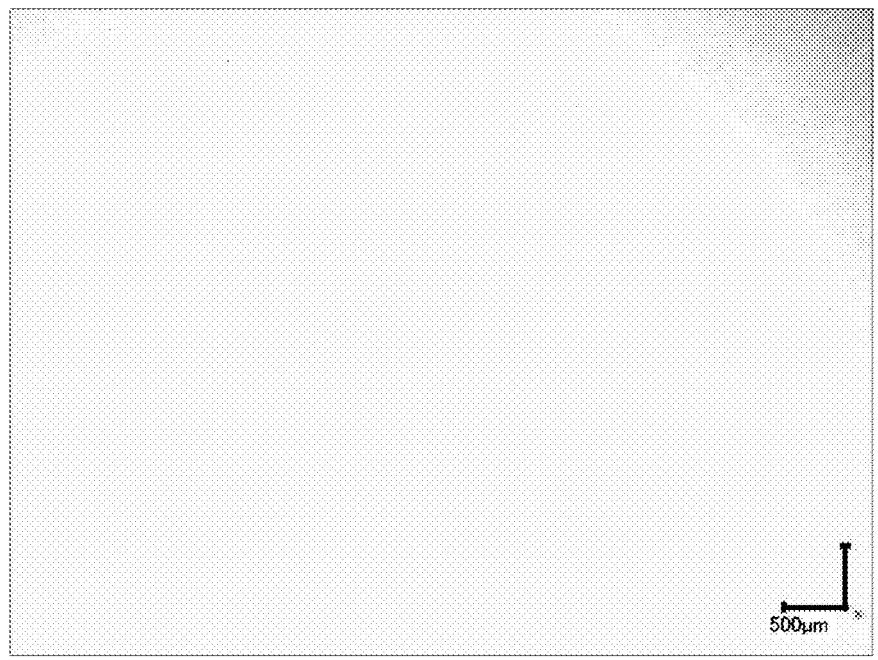
FIGS. 7A and 7B show a substrate powder lacquered in accordance with the invention with full lacquer coverage.
Figure 7B:
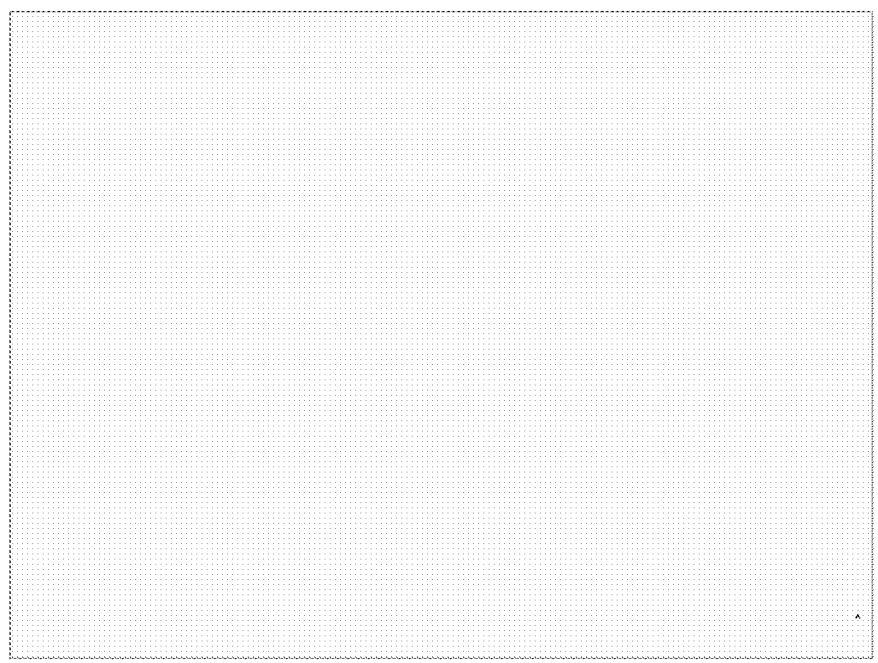

FIGS. 7A to 7B shows a light-microscopic image of the lacquering result after the powder lacquering of a profile in accordance with Example 6 (FIG. 7A). The image was taken at 50× magnification. FIG. 7B shows a black and white variant of the depiction in FIG. 7A, which was obtained by means of a digital image conversion and serves as the basis for a determination of the lacquer coverage rate. A lacquer coverage rate of about 100% is determined for FIG. 7B. The lacquer coverage is thus perfect.

Figure 8:
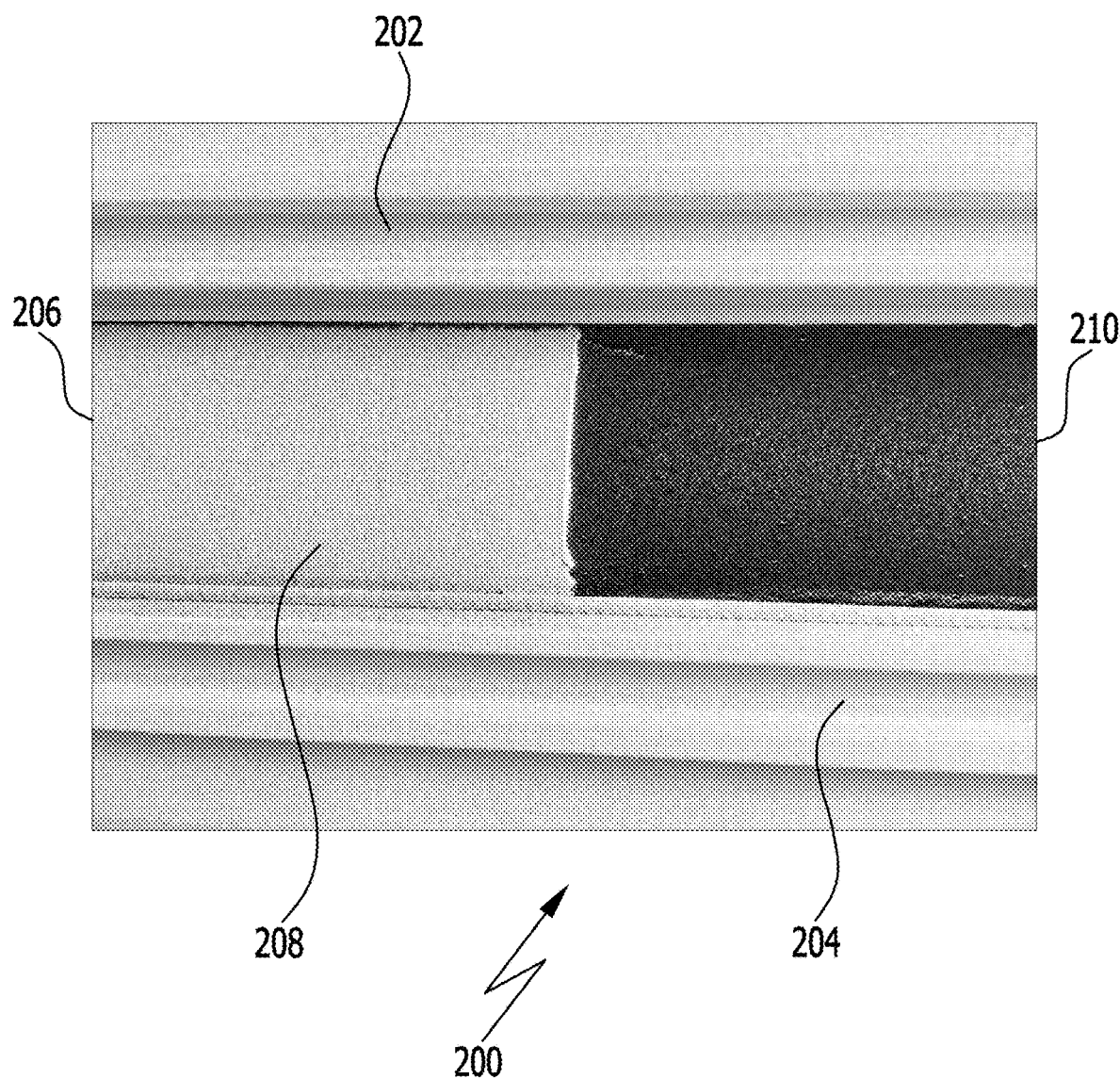
FIG. 8 shows lacquer coverage in direct comparison of a substrate coated in accordance with the invention and an uncoated substrate.

FIG. 8 shows a photographic image of a plastic-aluminum composite profile 200 with a first and a second metal profile 202, 204, which are connected to each other by way of a substrate 206 that is configured as an insulating profile, directly after the application of a white lacquer powder (electrostatic powdering), but before the lacquer baking process.

In the left region 208 of the substrate 206, before the powder application the substrate base body was equipped in accordance with the invention with a coating according to Example 7 described in the following, as is shown roughly in the case of the insulating profile of FIG. 3C. In the right region 210 of the substrate 206, the substrate base body was not equipped with a coating in accordance with the invention and thus corresponds to the subsequently described reference sample from Example 7.

The powder application to the present composite sample took place in one operation on the dried composite profile. There are very considerable differences in the lacquer coverage rate, which in the region 208 is nearly 100% and in the region 210 lacquer deposition is hardly visible to the naked eye.

EXAMPLES

In the following examples the specific surface resistance was determined on substrate base bodies (reference examples 1 to 3) and on substrates in accordance with the invention (examples 4 to 6) after storage in a standard climate and after an additional drying.

In each case extruded insulating profiles were used as substrate base bodies, the measurement of the specific surface resistance was performed on the so-called viewing side 28 of the section 12 of the substrate base body 10 and on the surface of the coating 32, respectively.

Example 1 (Reference)

In this example a solid, extruded insulating profile 10 with a planar middle section similar to the one in FIG. 1A is used, wherein the insulating profile is made of a polymeric material (polymer blend of PA66 and PPE with similar weight proportions) and with a content of glass fibers (GF) of 10% by weight. PA66 is used here as a first polymer and forms the continuous phase in the blend with PPE, while PPE is discontinuously dispersed in microscopically fine droplets.

A planar test piece is then milled from the profile, which is suitable for the measurement of the specific surface resistance.

The measured values for the specific surface resistance, measured under various conditions, are displayed in Table 1.

Example 2 (Reference)

In this example, again a solid, extruded insulating profile 10 with a planar middle section 10 similar to the one depicted in FIG. 1A is used, wherein the insulating profile is made of the polymeric material TECATHERM® LO from the company Ensinger GmbH. This is a polymer blend of PA66 and PPE (with similar weight proportions) with a content of glass fibers (GF) of 20% by weight. PA66 is used here as a first polymer and forms the continuous phase in the blend with PPE, while PPE is discontinuously dispersed in μm-sized droplets.

A planar test piece is then milled from the profile, which is suitable for measuring the specific surface resistance.

The measured values for the specific surface resistance, measured under various conditions, are displayed in Table 1. Due to the higher proportion of glass fibers, it results in a slightly higher specific surface resistance in comparison to the measured values of Example 1.

Example 3 (Reference)

In this example, again a solid, extruded insulating profile 10 with a planar middle section similar to the one depicted in FIG. 1A is used, wherein the insulating profile Insulbar® REG is made of the polymeric material TECATHERM® 66 GF from the company Ensinger GmbH. In this case, PA66 is the first polymer and is reinforced by a content of glass fibers (GF) of 25% by weight. A planar test piece is then milled from the profile, which is suitable for the measurement of the specific surface resistance.

The measured values for the specific surface resistance, measured under various conditions, are displayed in Table 1. Due to the different composition (no PPE fraction) of the polymeric material, in particular the thereby higher proportion of (moisture-absorbing) PA66, there is a further reduced specific surface resistance in comparison to the measured values in Examples 1 and 2.

The lacquer coverage rate of the dried and powder lacquered profile is only about 56% and is thus obviously insufficient. The lacquering tests were performed with a white powder lacquer of the type SA816G Interpon D1036 (manufacturer: Akzo Nobel Powder Coatings GmbH). For this purpose, the powder lacquer was applied to the pre-dried substrate using a commercially available powder gun for electrostatic powder coating and was baked in an oven at 200° C. for 20 minutes.

Example 4

In this example again an insulating profile 10, as described in (reference) Example 1, is used as a substrate base body.

In contrast to Example 1, the insulating profile 10 has now been provided, in accordance with the invention, with a coating 32, as can be seen in FIG. 1D.

A coating composition containing conductive soot was produced as the coating mass for producing the coating 32. For this purpose, a commercially available conductive soot concentrate of the type Hubron NBB310 (manufacturer: Hubron International, Great Britain) in concentrated methane acid (concentration >98%, Carl Roth GmbH+Co. KG) with a solids content of 50 g/l was introduced, dispersed, and applied to the surface of the substrate base body by means of spray coating. The conductive soot concentrate Hubron NBB310 is, according to the manufacturer's information, conductive soot in a matrix polymer of PA6 with small amounts of an unspecified ethylene terpolymer as a modifier.

The PA6 mass with conductive soot was dissolved under heavy stirring upon introduction into the methane acid and was subsequently further dispersed using a rotor-stator mixer (Ultra-Turrax of the company IKA) to finely distribute the conductive soot in the PA6 methane acid solution. This coating composition is used in a timely manner in order to avoid degradation or sedimentation.

Alternatively, of course other dispersion techniques can be used like, for example, grinding in ball mills, wet mills, colloid mills, or by means of high-pressure homogenizers, rolling mills and ultrasonic homogenizers. This process can finally be supplemented by pressing through fine nozzles, decanting, filtering, or otherwise fractioning one or more times in order to remove poorly dispersed coarse fractions of the conductive soot.

The spraying of the coating composition onto the substrate base body is carried out by means of a pressurized air-operated lacquer spray gun with a flat jet nozzle (nozzle diameter 1.5 mm), wherein the substrate base body is continuously moved through the fine mist, such that a thin but deep black and opaque application is obtained without large amounts of the liquid coating composition accumulating.

The drying is carried out by airing the substrates at room temperature with good ventilation, this being completed in a time of about 0.5 to 1 minute and the substrates then being hand-dry and matte black.

The average layer thickness of the coating 32 was about 1 µm to about 5 µm.

The measured values for the specific surface resistance of the coating 32, measured under different conditions, are displayed in Table 1. In comparison to the measured values of Examples 1 to 3, there is a significantly reduced specific surface resistance due to the proportion of additive (conductive soot). The effect of the drying process on the measured specific surface resistance is lower (as a percentage) here than in the reference examples 1 to 3.

Example 5

In this example again an insulating profile 10, described as described in Example 2, is used as a substrate base body.

In contrast to Example 2, the insulating profile 10 has now been provided, in accordance with the invention, with a coating 32, as can be seen in FIG. 1D.

The coating 32 way produced from a composition in accordance with Example 4.

The spraying of the coating composition onto the substrate and the drying takes place analogously to Example 4.

The average layer thickness of the coating 32 was about 1 µm to about 5 µm.

The measured values for the specific surface resistance of the coating 32, measured under different conditions, are displayed in Table 1. In comparison to the measured values of Examples 1 to 3, there is a significantly reduced specific surface resistance due to the proportion of additive (conductive soot). The effect of the drying process on the measured specific surface resistance is lower (as a percentage) here, too, than in the reference Examples 1 to 3.

Example 6

In this example again an insulating profile 10, described as described in Example 3, is used as a substrate base body.

In contrast to Example 3, the insulating profile 10 has now been provided, in accordance with the invention, with a coating 32, as can be seen in FIG. 1D.

The coating 32 was obtained from a coating composition in accordance with the description in Example 4.

The spraying of the coating composition onto the substrate and the drying again take place analogously to Example 4.

The average layer thickness of the coating 32 was about 1 µm to about 5 µm.

The measured values for the specific surface resistance of the coating 32, measured under different conditions, are displayed in Table 1. The effect of the drying process on the measured specific surface resistance is lower (as a percentage) here than in the reference Examples 1 to 3.

The lacquer coverage rate of the dried and powder lacquered profile is about 100% and is thus perfect. The lacquering tests were performed analogously to Example 3 and again with a white powder lacquer of the type SA816G Interpon D1036 (manufacturer: Akzo Nobel Powder Coatings GmbH). For this purpose, the powder lacquer was applied to the pre-dried substrate using a commercially available powder gun for electrostatic powder coating and was baked in an oven at 200° C. for 20 minutes.

Examples 1 to 6 hereby clearly show that the specific surface resistance can already be significantly reduced by applying a thin coating in according to the invention and thus can result in electrical conductivity of the surface. An adaptation of the surface resistance, if desired, is easily possible by adapting the formulation, for example by changing the proportion of the conductive additive.

Example 7

An insulating profile 30, produced in accordance with the invention, with the coating 32 was processed to a metal-plastic profile (analogously to FIG. 2A) and subsequently electrostatically lacquered with a white powder lacquer together with an untreated insulating profile (without a coating) as a reference example.

A bone-shaped in insulating profile of the type Insulbar® L018 from the company Ensinger GmbH, which was coated in accordance with the invention with a dispersion of Hubron NBB310 in methane acid (solids content 50 g/L), serves here as a base.

The production of the coating composition and the implementation of the spraying of the coating composition correspond to the description in Example 4. The average layer thickness of the coating 32 was about 1 µm to about 5 µm.

To be able to compare the positive effects on the substrate in accordance with the invention directly with the untreated substrate base body, for test purposes rectangular regions of the substrate base bodies were covered and as a result were not provided with the coating in segments. One thus obtains test samples in the form of substrates (insulating profiles) which have a direct sequence of regions or segments that take well and take poorly to being coated (see FIG. 8).

The lacquering tests were performed with a white powder lacquer of the type SA816G Interpon D1036 (manufacturer: Akzo Nobel Powder Coatings GmbH). The powder lacquer was applied to the pre-dried substrates (<0.1% by weight residual moisture) using a commercially available powder gun for electrostatic powder coating and was baked in an oven at 200° C. for 20 minutes.

While no continuously covering lacquer layer could be formed on the reference example, i.e., the profile segment 210 without a coating in accordance with the invention (lacquer coverage not visible to the naked eye, thus completely inadequate), the powder lacquering of the substrate 206 in accordance with the invention in the region 208 resulted in a visually appealing, continuous, uniform white lacquer layer with very good lacquer adhesion to the coating 32 in accordance with the invention.

The lacquer adhesion to the substrate in the region 208 was tested using a cross-cut test (DIN EN ISO 2409), the result of which is shown in FIGS. 5A and 5B. The determined cross-cut value in this case was "0", which is the best possible result. The lacquering result using a substrate in accordance with the invention is thus judged to be excellent.

Example 8

In order to evaluate the possible change in the mechanical properties of the substrates 30 due to contact with a good solvent for the first polymer—in this case methane acid—mechanical test were performed on uncoated substrate base bodies 10 of the type Insulbar® REG in accordance with Example 3 and on substrates coated in accordance with the invention according to Example 6—each without a powder lacquering having been performed.

Mechanical tests were hereby performed in the form of tensile tests, each with a set of n=10 test pieces; these were milled from the insulating profiles used. For evaluating the parameters E-modulus, transversal and longitudinal tensile strength (in relation to the longitudinal direction of the profiles) and the elongation at break, in each case the arithmetic mean was established.

For Example 8a, an untreated substrate base body 10 of the type insulbar REG as described in Example 7 is used as a reference. Example 8b corresponds to the substrate coated in accordance with the invention (insulating profile 30 with the coating 32) in Example 6. The results are summarized in Table 2 and show that the application of a coating 32 does not significantly influence the observed mechanical parameters of the substrate base body.

TABLE 1 realized layer thicknesses of the coatings in Examples 4 to 6 are on average about 1 μm to about 5 μm.

| Example | First polymer | Matrix polymer | Conductive additive | Material substrate base body | Coating | Specific surface resistance (storage in a standard climate) [Ω] | Specific surface resistance after drying (160° C./6 h) [Ω] |
|---|---|---|---|---|---|---|---|
| 1 | PA66 | without | without | blend of PA66 with PPE and 10% GF | uncoated—reference | 5.69E+13 | 6.63E+14 |
| 2 | PA66 | without | without | blend of PA66 with PPE and 20% GF | uncoated—reference | 1.49E+14 | 7.20E+14 |
| 3 | PA66 | without | Without | PA66 25% GF | uncoated—reference | 4.50E+13 | 2.73E+14 |
| 4 | PA66 | PA6 | conductive soot | blend of PA66 with PPE and 10% GF | spray coating with dispersion of conductive soot-PA6 compound in formic acid (solids content 50 g/L) | 7.79E+05 | 1.13E+06 |
| 5 | PA66 | PA6 | conductive soot | blend of PA66 with PPE and 20% GF | spray coating with dispersion of conductive soot-PA6 compound in formic acid (solids content 50 g/L) | 5.12E+05 | 7.73E+05 |
| 6 | PA66 | PA6 | conductive soot | PA66 25% GF | spray coating with dispersion of conductive soot-PA6 compound in formic acid (solids content 50 g/L) | 1.7E+05 | 2.02E+05 |

TABLE 2 change in selected mechanical properties of substrate base bodies after the application of a coating in accordance with the invention

| Example | Substrate base body | Coating | E-modulus [relative] | Elongation at break [relative] | Tensile strength, longitudinal [relative] | Tensile strength, transversal [relative] | Residual moisture [% by weight] |
|---|---|---|---|---|---|---|---|
| 8a-ref. | insulbar REG | without | 100.0% | 100.0% | 100.0% | 100.0% | 0.3 |
| 8b | insulbar REG | with | 100.5% | 102.4% | 100.1% | 99.3% | 0.3 |

The invention claimed is:

1. A polymer-based substrate, comprising
a substrate base body made using a polymeric material and a coating applied as a layer to a surface region of the substrate base body, wherein the polymeric material comprises a first polymer,
wherein the coating comprises a matrix polymer and an additive which is dispersed in the matrix polymer and reduces the surface resistance of the coating, said additive providing a specific surface resistance of the coating of $10^{10}$ Ohm or less,
wherein said coating has a thickness in the range of 0.1 μm to 25 μm,
said first polymer and said matrix polymer being selected from the polymer groups polyamide, polyester, polyether, polyketone, polyvinyl, polyolefin and copolymers thereof; and wherein the matrix polymer is selected such that it is compatible with the first polymer, said polymer-based substrate further comprising a powder lacquer layer having a layer thickness in the range of 10 μm to 300 μm.

2. The substrate in accordance with claim 1, wherein the specific surface resistance of the layer with a reduced specific surface resistance is $10^9$ Ohm or less.

3. The substrate in accordance with claim 1, wherein the first polymer and/or the matrix polymer is/are selected from the polymer group of polyamides.

4. The substrate in accordance with claim 1 wherein the first polymer in the polymeric material is present as a blend with a second polymer.

5. The substrate in accordance with claim 1, wherein the polymeric material further comprises reinforcing substances.

6. The substrate in accordance with claim 1, wherein the additive for reducing the surface resistance of the coating is selected from conductive soot, carbon nanotubes (CNT), carbon fibers, carbon layered materials, electrically conductive organic compounds, conductive polymers, electrically conductive ceramic, metal powders and metal fibers.

7. The substrate in accordance with claim 1, wherein the substrate is configured as a heat-insulating profile, for the production of window, door, roof, or facade elements.

8. The substrate in accordance claim 1, wherein the substrate is designed as a moulded part for an application outdoors.

9. The substrate in accordance with claim 1, wherein the matrix polymer has a temperature stability of about 200° C. or more.

10. The substrate in accordance claim 1, wherein the coating is UV-stable.

11. The substrate in accordance with claim 1, wherein the powder lacquer layer on the coating in a lacquered region has a lacquer coverage rate of about 90% or more.

12. The substrate in accordance with claim 3, wherein
a) the first polymer is a polyamide 66, a polyamide 6, or a partially aromatic polyamide, and/or
b) the matrix polymer is a polyamide 6, a polyamide 66, a polyamide 610, or a polyamide 410.

* * * * *